US010129740B2

(12) United States Patent
Saito et al.

(10) Patent No.: US 10,129,740 B2
(45) Date of Patent: Nov. 13, 2018

(54) ESTABLISHING A CONNECTION BASED ON POSITION

(71) Applicant: SONY CORPORATION, Tokyo (JP)

(72) Inventors: Erika Saito, Tokyo (JP); Katsutoshi Itoh, Tokyo (JP); Tomoya Yamaura, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/847,749

(22) Filed: Sep. 8, 2015

(65) Prior Publication Data

US 2015/0382186 A1 Dec. 31, 2015

Related U.S. Application Data

(63) Continuation of application No. 13/409,437, filed on Mar. 1, 2012, now Pat. No. 9,167,508.

(30) Foreign Application Priority Data

Mar. 8, 2011 (JP) .................................. 2011-050477
Jan. 24, 2012 (JP) .................................. 2012-012265

(51) Int. Cl.
*H04W 48/16* (2009.01)
*H04W 12/00* (2009.01)
(Continued)

(52) U.S. Cl.
CPC ........... *H04W 12/00* (2013.01); *H04W 4/023* (2013.01); *H04W 48/16* (2013.01); *H04W 76/14* (2018.02); *H04W 84/20* (2013.01)

(58) Field of Classification Search
CPC ...... H04W 12/00; H04W 48/16; H04W 4/023; H04W 76/023; H04W 84/20
See application file for complete search history.

(56) References Cited

U.S. PATENT DOCUMENTS

2008/0037444 A1  2/2008  Chhabra
2009/0227282 A1* 9/2009  Miyabayashi ...... H04L 63/0492
                                                          455/552.1
(Continued)

FOREIGN PATENT DOCUMENTS

EP      1947824 A    7/2008
JP      2001-197069 A  7/2001
(Continued)

OTHER PUBLICATIONS

Wi-Fi Protected Setup Specification, Version 1.0h, Wi-Fi Alliance, Dec. 2006 (pp. 1-6, 71-72).*
(Continued)

*Primary Examiner* — Asad Nawaz
*Assistant Examiner* — Zhaohui Yang
(74) *Attorney, Agent, or Firm* — Chip Law Group

(57) ABSTRACT

Provided is a wireless communication apparatus including a communication unit capable of wireless communication with another wireless communication apparatus, a determination unit for determining whether the communication unit is in proximity to the other wireless communication apparatus, and a control unit for performing, in a case the communication unit is determined to be in proximity to the other wireless communication apparatus, a connection procedure between the communication unit and the other wireless communication apparatus.

5 Claims, 16 Drawing Sheets

(51) Int. Cl.
*H04W 76/14* (2018.01)
*H04W 4/02* (2018.01)
*H04W 84/20* (2009.01)

(56) References Cited

U.S. PATENT DOCUMENTS

| | | | | |
|---|---|---|---|---|
| 2009/0328189 | A1* | 12/2009 | Budyta | H04L 9/32 726/14 |
| 2010/0217705 | A1* | 8/2010 | Tachibana | G06Q 20/10 705/39 |

FOREIGN PATENT DOCUMENTS

| | | |
|---|---|---|
| JP | 2001197069 A | 7/2001 |
| JP | 2003-229808 A | 8/2003 |
| JP | 2004-015558 A | 1/2004 |
| JP | 2004015558 A | 1/2004 |
| JP | 2004-254311 A | 9/2004 |
| JP | 2004254311 A | 9/2004 |
| JP | 2007-060029 A | 3/2007 |
| JP | 2007060029 A | 3/2007 |
| JP | 2007-089159 A | 4/2007 |
| JP | 2007089159 A | 4/2007 |
| JP | 2010-500817 A | 1/2010 |
| JP | 2010-507282 A | 3/2010 |
| JP | 2010-087922 A | 4/2010 |
| JP | 2010-523023 A | 7/2010 |
| JP | 2010-279042 A | 12/2010 |
| WO | 2008/048809 A2 | 4/2008 |
| WO | 2008/119150 A | 10/2008 |
| WO | 2008119150 A1 | 10/2008 |

OTHER PUBLICATIONS

Japanese Office Action dated Sep. 15, 2015 in patent application No. 2012012265.
Office Action received for Japanese Patent application No. 2012-012265, dated Jun. 7, 2016, 8 pages of office action including 5 pages of English translation.
Office Action Received for Chinese Patent Application No. 201210056175.5, dated Feb. 2, 2016, 19 Pages Including 11 Pages of English Translation.
Office Action Received for Japanese Patent Application No. 2012-012265, dated Feb. 2, 2016, 12 Pages Including 6 Pages of English Translation.
Office Action for JP Patent Application No. 2016-040620, dated Jan. 10, 2017, 4 pages of Office Action and 4 pages of English Translation.
Office Action for JP Patent Application No. 2016-040620, dated Aug. 22, 2017, 04 pages of Office Action and 03 pages of English Translation.

* cited by examiner

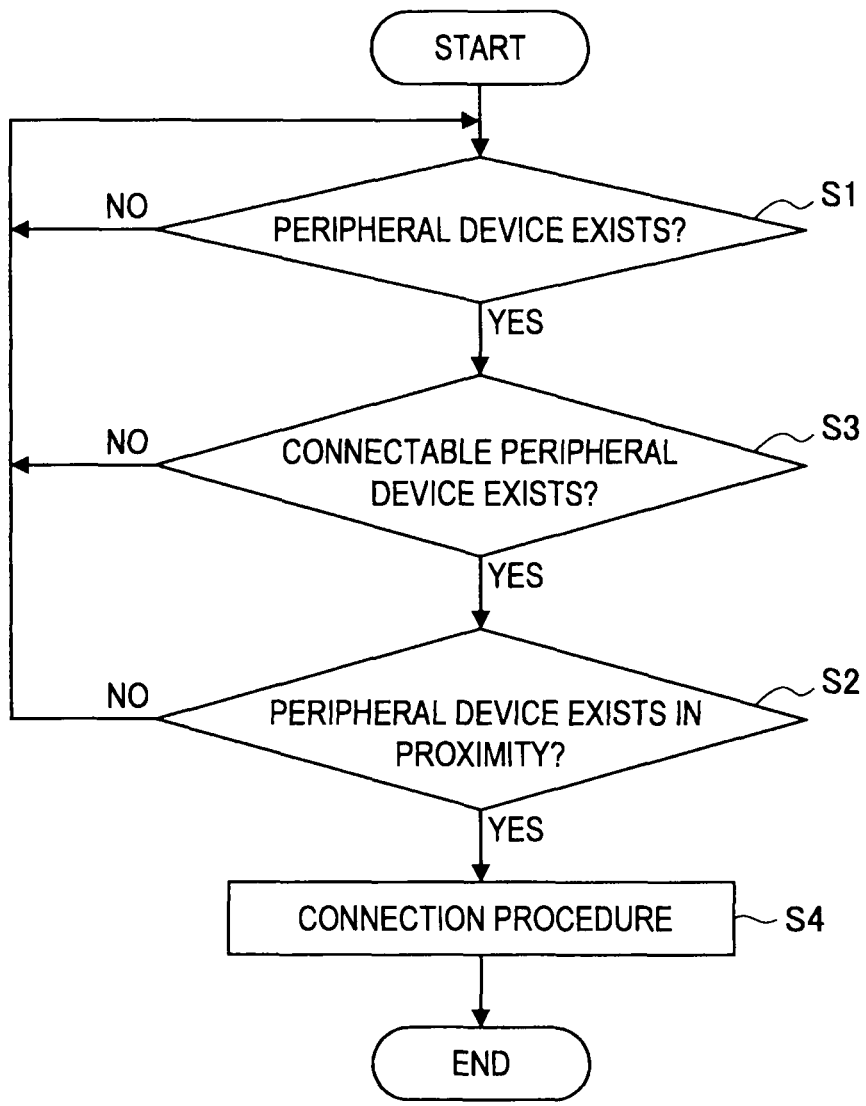

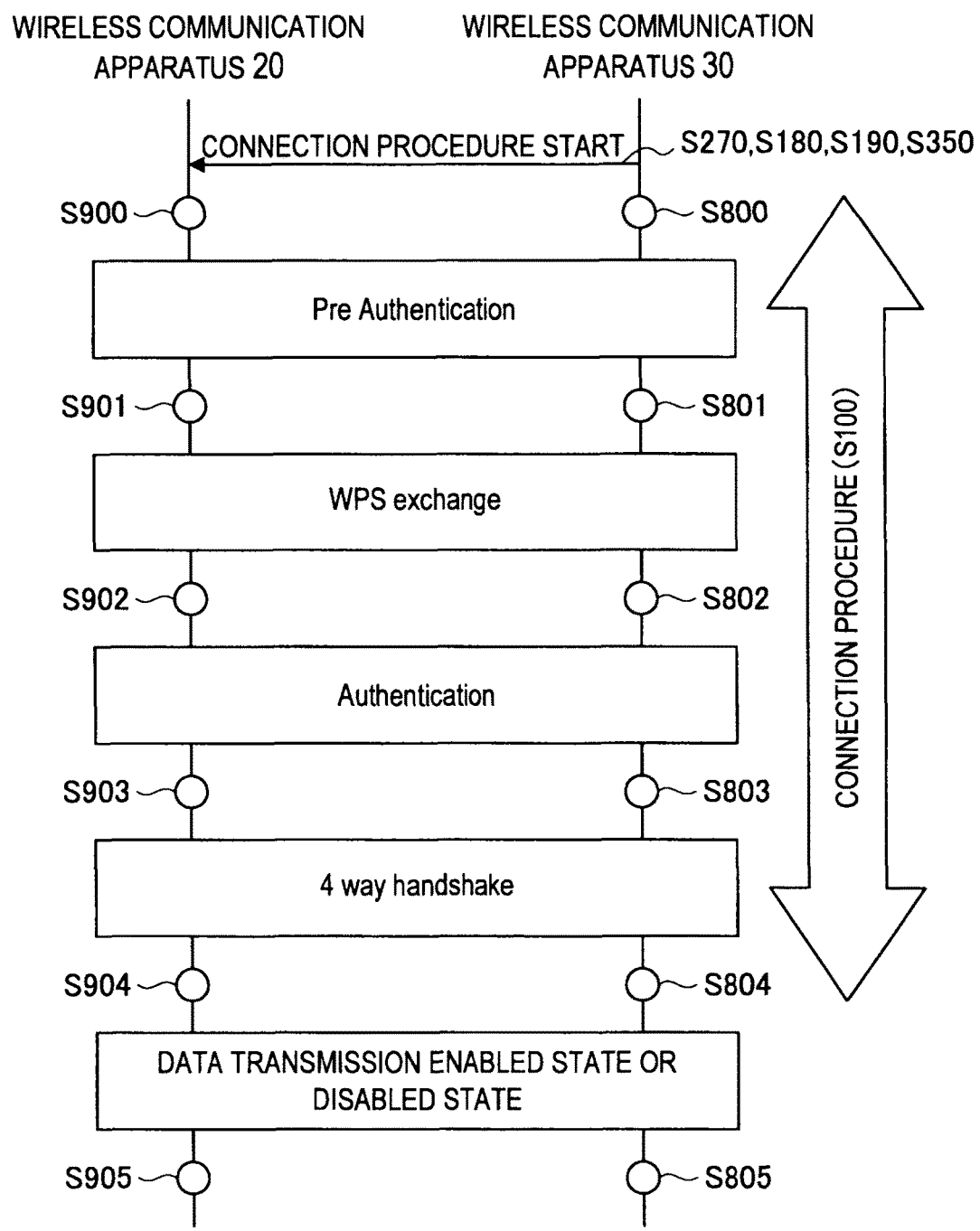

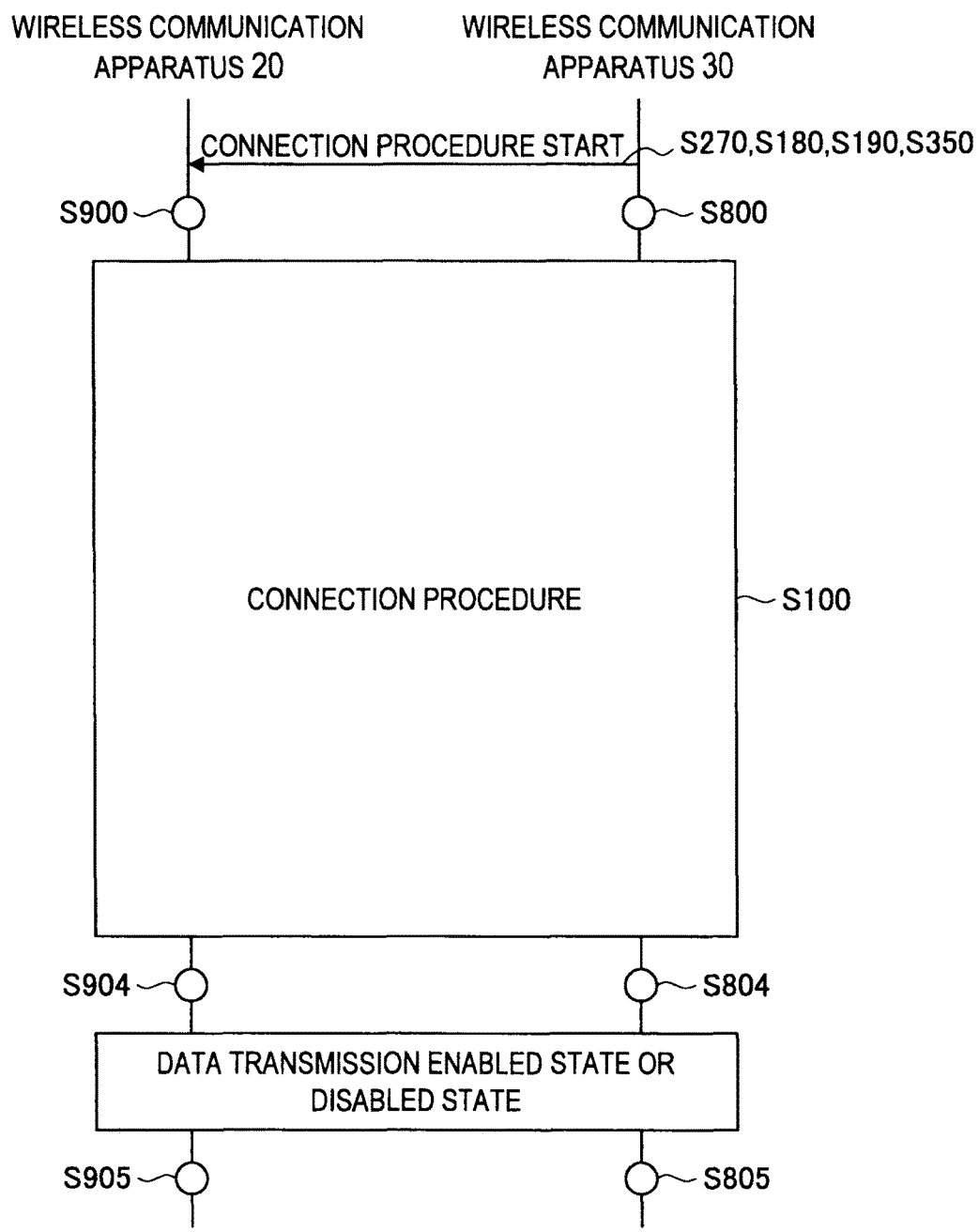

ESTABLISHING A CONNECTION BASED ON POSITION

CROSS-REFERENCE TO RELATED APPLICATIONS

The present application is a continuation application of U.S. patent application Ser. No. 13/409,437, filed on Mar. 1, 2012, which claims the benefit of priority from prior Japanese Priority Patent Application JP 2011-050477 filed in the Japan Patent Office on Mar. 8, 2011, and Japanese Priority Patent Application JP 2012-012265 filed in the Japan Patent Office on Jan. 24, 2012, the entire content of which is hereby incorporated by reference.

BACKGROUND

The present disclosure relates to a wireless communication apparatus, a wireless communication method, and a wireless communication system.

According to wireless LAN widely known by the standards of IEEE 802.11, a wireless communication apparatus (for example, a station) functioning as a slave unit indicates its intent to connect to a wireless communication apparatus (for example, an access point) functioning as a master unit and then the user of the slave unit performs connection setup according to security setting of the master unit, and thereby the slave unit is connected to the master unit.

On the other hand, security setting and connection between the master unit and the slave unit are also performed by the user of the master unit and the user of the slave unit each pushing a Wi-Fi Protected Setup (hereinafter, "WPS") push button.

SUMMARY

Accordingly, with the wireless LAN of related art, there is an issue that wireless communication apparatuses are not connected to each other unless there is connection setup according to the security setting of the master unit or a burdensome operation of pushing a Wi-Fi Protected Setup (hereinafter, "WPS") push button performed by a user.

In light of the foregoing, it is desirable to provide a wireless communication apparatus, a wireless communication method, and a wireless communication system which are novel and improved, and which are capable of reducing the burden placed on a user when connecting wireless communication apparatuses to each other.

According to an embodiment of the present disclosure, there is provided a wireless communication apparatus which includes a communication unit capable of wireless communication with another wireless communication apparatus, a determination unit for determining whether the communication unit is in proximity to the other wireless communication apparatus, and a control unit for performing, in a case the communication unit is determined to be in proximity to the other wireless communication apparatus, a connection procedure between the communication unit and the other wireless communication apparatus.

In a case reception strength of a wireless signal received by the communication unit from the other wireless communication apparatus is a predetermined value or higher, the determination unit may determine that the communication unit is in proximity to the other wireless communication apparatus.

In a case the communication unit receives a wireless signal from a plurality of other wireless communication apparatuses and more than one wireless signal exists whose reception strength is the predetermined value or higher, the determination unit may determine that the communication unit is in proximity to the other wireless communication apparatus that has transmitted the wireless signal whose reception strength is highest. Additionally, this reception strength may be an instantaneous value of the wireless signal, a value obtained by averaging the reception strength received by the communication unit within a predetermined period, or a value obtained by weighting the reception strength. These values are calculated for each transmission source (other wireless communication apparatus). This determination and the determination described above, that is the process of determining, in a case the reception strength is a predetermined value or higher, that the communication unit is in proximity to the other wireless communication apparatus may be used in combination.

In a case a connection procedure having proximity to the communication unit as a connection permission condition is allowed, the other wireless communication apparatus may transmit a wireless signal including proximity-based connection procedure available information to that effect. The determination unit may determine whether the proximity-based connection procedure available information is included in the wireless signal. In a case the communication unit is determined to be in proximity to the other wireless communication apparatus and the proximity-based connection procedure available information is determined to be included in the wireless signal, the control unit may perform the connection procedure between the communication unit and the other wireless communication apparatus.

The wireless communication apparatus may further include a notification unit for issuing a notification regarding a start of the connection procedure, an end of the connection procedure, a change in status of the connection procedure or a result of the connection procedure.

The other wireless communication apparatus may be a slave unit among at least one slave unit connected to a master unit. The communication unit may acquire from the master unit list information of the at least one slave unit. The determination unit may discover the other wireless communication apparatus based on the list information acquired by the communication unit, and determines whether the communication unit is in proximity to the other wireless communication apparatus which has been discovered.

According to another embodiment of the present disclosure, there is provided a wireless communication method which includes determining whether a communication unit capable of wireless communication with another wireless communication apparatus is in proximity to the other wireless communication apparatus, and performing, in a case the communication unit is determined to be in proximity to the other wireless communication apparatus, a connection procedure between the communication unit and the other wireless communication apparatus.

According to another embodiment of the present disclosure, there is provided a wireless communication system including a first wireless communication apparatus and a second wireless communication apparatus capable of wireless communication. The first wireless communication apparatus includes a communication unit capable of wireless communication with the second wireless communication apparatus, a determination unit for determining whether the communication unit is in proximity to the second wireless communication apparatus, and a control unit for performing, in a case the communication unit is determined to be in proximity to the second wireless communication apparatus, a connection procedure between the communication unit and the second wireless communication apparatus.

According to the embodiments of the present disclosure described above, a user of a wireless communication apparatus has only to near his/her wireless communication apparatus to another wireless communication apparatus to have these wireless communication apparatuses perform a connection procedure. Accordingly, with this wireless communication apparatus, the burden placed on the user when connecting wireless communication apparatuses can be reduced compared to related art.

BRIEF DESCRIPTION OF THE DRAWINGS

FIG. 2B is a flow chart showing an overview of a process performed by the wireless communication system;

FIG. 16 is an explanatory diagram showing the timing of issuing a notification regarding a status by a notification unit; and FIG. 17 is an explanatory diagram showing the timing of issuing a notification regarding a status by a notification unit.

DETAILED DESCRIPTION OF THE EMBODIMENT(S)

Figure 1:
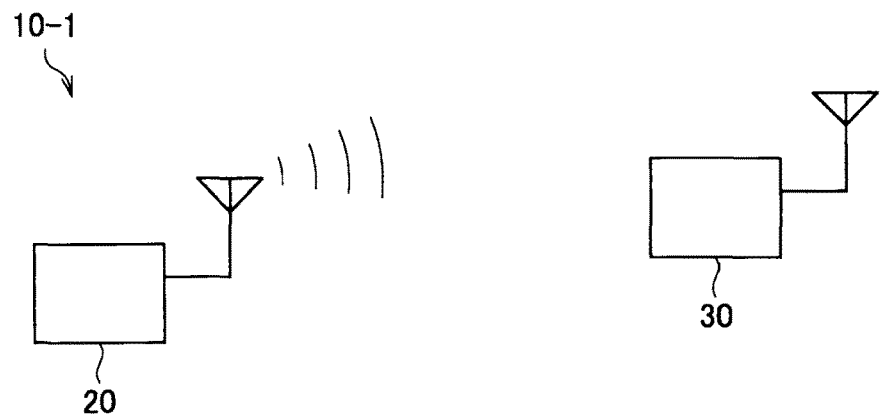
FIG. 1 is a block diagram showing a wireless communication system according to a first embodiment of the present disclosure.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

Additionally, the explanation will be given in the following order.

1. First Embodiment (Case of Wireless Communication Apparatuses Not Belonging to Group Connecting to Each Other)
2. Second Embodiment (Case of Wireless Communication Apparatus Not Belonging to Group Connecting to Wireless Communication Apparatus (Master Unit) in Group)
3. Third Embodiment (Case of Wireless Communication Apparatus Not Belonging to Group Connecting to Wireless Communication apparatus (Slave Unit) in Group)
4. Supplement 1. First Embodiment

[Configuration of Wireless Communication System]

First, a configuration of a wireless communication system 10-1 will be described based on FIG. 1. The wireless communication system 10-1 includes wireless communication apparatuses 20 and 30. In summary, the wireless communication apparatus 20 performs the following process. Additionally, the wireless communication apparatus 30 also performs the same type of process.

That is, the wireless communication apparatus 20 transmits to a surrounding area a first wireless signal, with no specific destination, including identification information used for unique identification of itself. The wireless communication apparatus 20 thereby notifies the wireless communication apparatus 30, which is another wireless communication apparatus, of its existence. As the first wireless signal, a probe request signal defined in IEEE 802.11, that has no specific destination, or a beacon signal is conceivable, for example. Additionally, the probe request signal includes response request information indicating that a response is desired.

The wireless communication apparatus 20, when receiving a first wireless signal transmitted from the wireless communication apparatus 30 existing in its periphery, identifies the wireless communication apparatus 30 based on the identification information included in this first wireless signal. The wireless communication apparatus 20 thereby discovers the wireless communication apparatus 30.

When the wireless communication apparatus 30 is discovered based on the first wireless signal and if the response request information is included in the first wireless signal, the wireless communication apparatus 20 transmits, to the wireless communication apparatus 30, as a second wireless signal, a probe response signal including identification information, destination information uniquely specifying the wireless communication apparatus 30, and response information indicating its intent to respond. Additionally, the probe response signal is defined in IEEE 802.11.

Furthermore, if the response request information is not included in the first wireless signal, that is, if the first wireless signal is a signal such as a beacon signal used for notification, the wireless communication apparatus 20 transmits, to the wireless communication apparatus 30, as the second wireless signal, a probe request signal including the identification information for uniquely identifying itself, the response request information indicating that a response is desired, and the destination information uniquely specifying the wireless communication apparatus 30, to notify the wireless communication apparatus 30 of its existence. The wireless communication apparatus 30 that has received such a second wireless signal responds to the signal (for example, by transmitting a probe response signal) to let the wireless communication apparatus 20 know that the wireless communication apparatus 30 is capable of responding.

In the case the second wireless signal is received from the wireless communication apparatus 30, the wireless communication apparatus 20 identifies the wireless communication apparatus 30 based on the identification information included in the second wireless signal. Accordingly, the wireless communication apparatus 20 can also discover the wireless communication apparatus 30 based on the second wireless signal. Likewise, the wireless communication apparatus 30 can discover the wireless communication apparatus 20 based on the second wireless signal transmitted from the wireless communication apparatus 20.

When the wireless communication apparatus 30 is discovered, the wireless communication apparatus 20 transmits to the wireless communication apparatus 30 a third wireless signal including the identification information, the destination information indicating the wireless communication apparatus 30, the response request information, and proximity-based connection procedure available information indicating that a connection procedure, having the proximity of the wireless communication apparatus 20 to the wireless communication apparatus 30 as a connection permission condition, is allowed. As the third wireless signal, a service discovery query signal defined in Wi-Fi Direct, for example, is conceivable.

In the case the third wireless signal is received from the wireless communication apparatus 30, the wireless communication apparatus 20 determines whether the connection procedure available information is included in the received third wireless signal. The wireless communication apparatus 20 returns to the wireless communication apparatus 30 a fourth wireless signal including the connection procedure available information, that is, information that a connection method having the proximity of the wireless communication apparatus 20 as a wireless communication connection procedure start trigger is possible. As the fourth wireless signal, a service discovery response signal defined in Wi-Fi Direct, for example, is conceivable. Next, in the case the wireless communication apparatus 20 determines, using the reception strength of the first wireless signal, the second wireless signal or the third wireless signal which has been received, that it is in proximity to the wireless communication apparatus 30 and determines that the connection procedure available information is included in the third wireless signal, it performs a connection procedure to the wireless communication apparatus 30.

On the other hand, in the case of receiving the fourth wireless signal from the wireless communication apparatus 30, the wireless communication apparatus 20 determines whether the connection procedure available information is included in the fourth wireless signal. In the case the wireless communication apparatus 20 determines, using the reception strength of the first wireless signal, the second wireless signal, or the fourth wireless signal, that it is in proximity to the wireless communication apparatus 30 and determines that the connection procedure available information is included in the fourth wireless signal, it performs a connection procedure to the wireless communication apparatus 30.

[Overview of Process of Wireless Communication System 10-1]

Figure 2A:
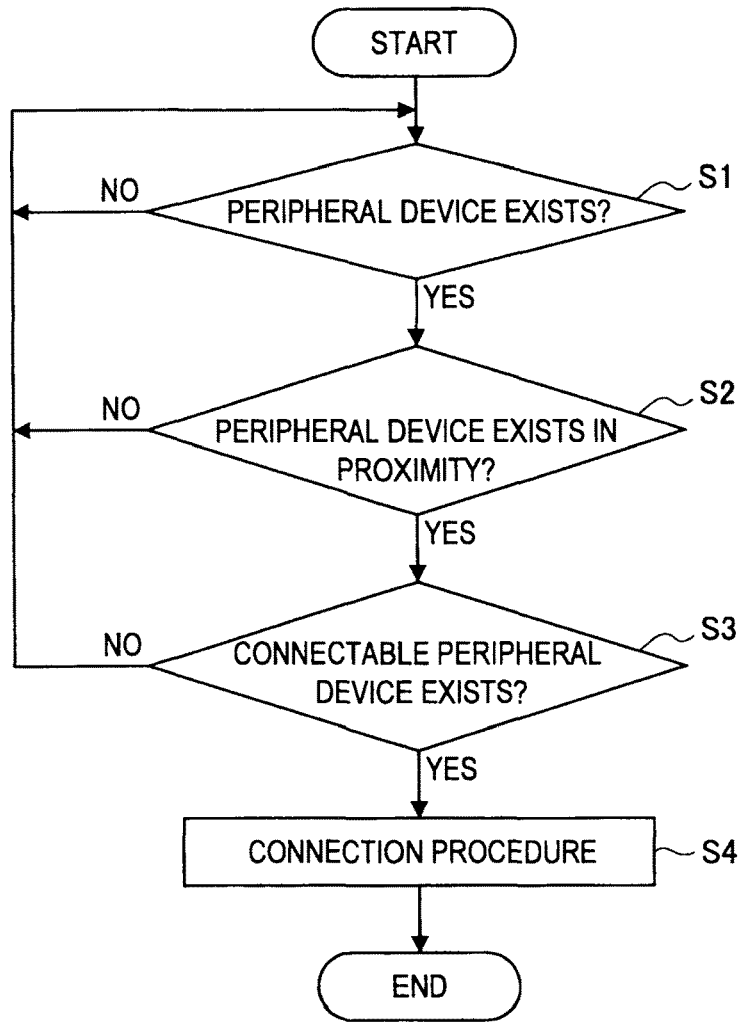
FIG. 2A is a flow chart showing an overview of a process performed by the wireless communication system.

Next, an overview of a process of the wireless communication system 10-1 will be described based on FIG. 2A. In step S1, the wireless communication apparatus 20 notifies the wireless communication apparatus 30 of its existence by transmitting a first wireless signal to a surrounding area. The wireless communication apparatus 30 receives the first wireless signal, and discovers the wireless communication apparatus 20 based on the first wireless signal. The wireless communication apparatus 30 that has discovered the wireless communication apparatus 20 transmits a second wireless signal to the wireless communication apparatus 20. The wireless communication apparatus 20 receives the second wireless signal, and discovers the wireless communication apparatus 30 based on the second wireless signal. Or, the wireless communication apparatus 20 discovers the wireless communication apparatus 30 by receiving a first wireless signal transmitted by the wireless communication apparatus 30.

In step S2, the wireless communication apparatus 20 transmits a third wireless signal to the wireless communication apparatus 30. The wireless communication apparatus 30 receives the third wireless signal, and transmits a fourth wireless signal to the wireless communication apparatus 20.

The wireless communication apparatus 20 receives the fourth wireless signal, and determines, using the reception strength of the fourth wireless signal, the first wireless signal received in step S1 or the second wireless signal, whether the wireless communication apparatus 30 is in proximity to the wireless communication apparatus 20. To be specific, if the reception strength is a predetermined value or higher, the wireless communication apparatus 20 determines that it is in proximity to the wireless communication apparatus 30, and if the reception strength is below the predetermined value, it determines that it is not in proximity to the wireless communication apparatus 30. The predetermined value here is the reception strength of a wireless signal received from the wireless communication apparatus 30 when the wireless communication apparatus 20 is separated from the wireless communication apparatus 30 by a few centimeters (for example, 1 to 5 cm), for example.

The wireless communication apparatus 20 proceeds to step S3 if it is determined to be in proximity to the wireless communication apparatus 30, and returns to step S1 if it is determined to be not in proximity to the wireless communication apparatus 30.

In step S3, the wireless communication apparatus 20 determines whether the connection procedure available information is included in the fourth wireless signal received in step S2, and if it is determined that the connection procedure available information is included in the fourth wireless signal, it proceeds to step S4, and if it is determined that the connection procedure available information is not included in the fourth wireless signal, it returns to step S1. For its part, the wireless communication apparatus 30 determines whether the connection procedure available information is included in the third wireless signal.

In step S4, the wireless communication apparatus 20 performs a connection procedure to the wireless communication apparatus 30. This connection procedure itself is the same as that of related art, and is a process that is performed when a WPS push button is pressed at each of the wireless communication apparatuses of the related art, for example. Additionally, as shown in FIG. 2B, the wireless communication apparatuses 20 and 30 may first perform the process of step S3, that is determination of whether the connection procedure available information is included in the received wireless signal, and then perform the process of step S2, that is, the proximity determination.

[Configurations of Wireless Communication Apparatuses 20, 30]

Figure 3:
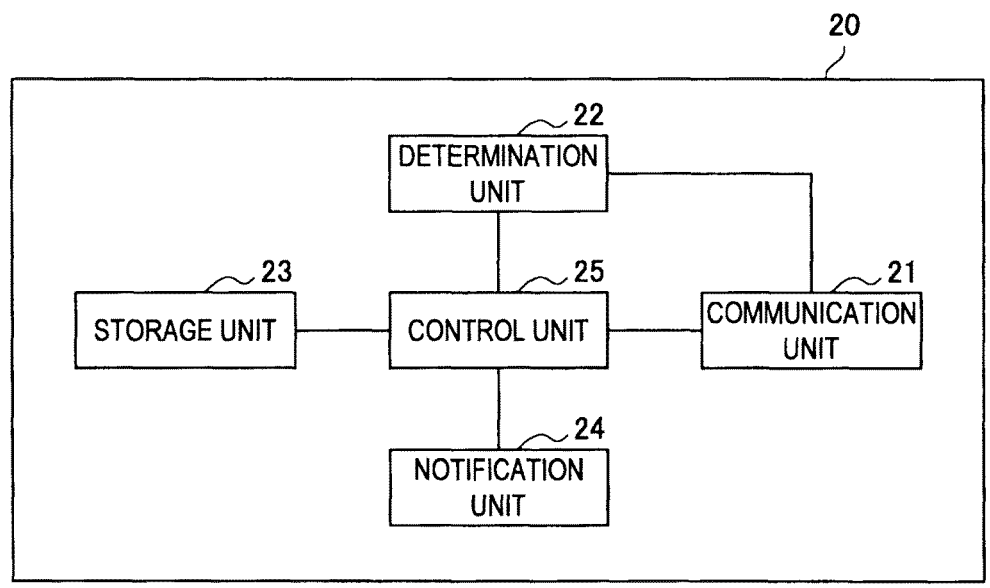
FIG. 3 is a block diagram of a wireless communication apparatus according to the embodiment.

Next, a detailed configuration of the wireless communication apparatus 20 will be described based on FIG. 3. The wireless communication apparatus 20 includes various hardware components such as a CPU, a ROM, a RAM, a communication device, a display, and the like, and performs various processes by the CPU reading and executing programs stored in the ROM. To be specific, the wireless communication apparatus 20 includes a communication unit 21, a determination unit 22, a storage unit 23, a notification unit 24, and a control unit 25.

The communication unit 21 is capable of wireless communication, that is, transmission/reception of a wireless signal, with the wireless communication apparatus 30, and transmits a wireless signal provided by the control unit 25 to outside, and receives first to fourth wireless signals transmitted from the wireless communication apparatus 30. When the first wireless signal is received, the communication unit 21 outputs the first wireless signal to the determination unit 22. When any of the second to fourth wireless signals is received, the communication unit 21 checks that the destination information in the received wireless signal specifies the wireless communication apparatus 20, and outputs the wireless signal to the determination unit 22. If the received wireless signal is not addressed to the wireless communication apparatus 20 or to unspecified majority, the communication unit 21 discards the wireless signal.

The determination unit 22 discovers a wireless communication apparatus 30 existing in the periphery of the wireless communication apparatus 20. To be specific, if the first or second wireless signal is provided by the communication unit 21, the determination unit 22 identifies the wireless communication apparatus 30 based on the identification information included in the first or second wireless signal. The determination unit 22 thereby discovers the wireless communication apparatus 30. The determination unit 22 generates destination information for uniquely specifying the wireless communication apparatus 30, based on the identification information included in the first or second wireless signal. In the case the wireless communication apparatus 30 is discovered based on the first wireless signal, the determination unit 22 outputs first discovery information including the destination information to the control unit 25. Here, if response request information is included in the first wireless signal, this response request information is included in the first discovery information. On the other hand, in the case the wireless communication apparatus 30 is discovered based on the second wireless signal, the determination unit 22 outputs second discovery information including the destination information and the response information or the response request information included in the second wireless signal to the control unit 25. Also, the determination unit 22 stores in the storage unit 23 the reception strength, for each transmission source, of the received signal which has been received. Additionally, the wireless communication apparatus 20 may separately include a determiner that determines whether a transmission source is in proximity, and the determination unit 22 may input the reception strength to this determiner. Or, both may be adopted.

Further, if the third or fourth wireless signal is provided by the communication unit 21, the determination unit 22 outputs the wireless signal to the control unit 25. Furthermore, the determination unit 22 determines whether the communication unit 21, that is, the wireless communication apparatus 20 is in proximity to the wireless communication apparatus 30. To be specific, if the reception strength of the received signal is the predetermined value or higher, the determination unit 22 determines that the wireless communication apparatus 20 is in proximity to the wireless communication apparatus 30, and if the reception strength is below the predetermined value, determines that the wireless communication apparatus 20 is not in proximity to the wireless communication apparatus 30. Additionally, in the process of the wireless communication apparatus 20, the wireless communication apparatus 30 or the like which is described below, the reception strength of mainly the third or fourth wireless signal is measured, but the wireless signal whose reception strength is to be measured may be any of the first to fourth wireless signals. More specifically, the wireless signal whose reception strength is to be measured may be a beacon, a probe request, a probe response, an action frame, or a combination of these receivable frames. Also, the reception strength may be an instantaneous value at the time of reception of a wireless signal, or may be a value obtained by performing a process for preventing erroneous detection, such as a value obtained by averaging (for example, arithmetic averaging) the reception strength of wireless signals received within a predetermined period from the same transmission source or a value calculated by passing a received signal through a weighted filter. These processes may be performed by the determination unit 22 or by a determiner that is separately provided.

In the case the wireless communication apparatus 20 is determined to be in proximity to the wireless communication apparatus 30, the determination unit 22 further determines whether connection procedure available information is included in the third wireless signal, and in the case connection procedure available information is determined to be included in the third wireless signal, outputs to the control unit 25 first connection start instruction information including destination information indicating the wireless communication apparatus 30 and also the response request information and the connection procedure available information included in the third wireless signal. On the other hand, if it is determined that connection procedure available information is not included in the third wireless signal or if it is determined that the wireless communication apparatus 20 is not in proximity to the wireless communication apparatus 30, the determination unit 22 outputs to the control unit 25 connection procedure unavailable information indicating that a connection procedure is not possible.

Likewise, in the case the wireless communication apparatus 20 is determined to be in proximity to the wireless communication apparatus 30, the determination unit 22 further determines whether connection procedure available information is included in the fourth wireless signal, and if connection procedure available information is determined to be included in the fourth wireless signal, outputs to the control unit 25 second connection start instruction information including destination information indicating the wireless communication apparatus 30 and also the response information and the connection procedure available information included in the fourth wireless signal. On the other hand, if it is determined that connection procedure available information is not included in the fourth wireless signal or if it is determined that the wireless communication apparatus 20 is not in proximity to the wireless communication apparatus 30, the determination unit 22 outputs to the control unit 25 connection procedure unavailable information indicating that a connection procedure is not possible.

In the case it is determined whether connection procedure available information is included in the third wireless signal and then it is determined that the wireless communication apparatus 20 is in proximity to the wireless communication apparatus 30, the determination unit 22 may output to the control unit 25 first connection start instruction information including destination information indicating the wireless communication apparatus 30 and also the response request information and the connection procedure available information included in the third wireless signal. On the other hand, if it is determined that connection procedure available information is not included in the third wireless signal or if it is determined that the wireless communication apparatus 20 is not in proximity to the wireless communication apparatus 30, the determination unit 22 may output to the control unit 25 connection procedure unavailable information indicating that a connection procedure is not possible.

Likewise, in the case it is determined whether connection procedure available information is included in the fourth wireless signal and then it is determined that the wireless communication apparatus 20 is in proximity to the wireless communication apparatus 30, the determination unit 22 may output to the control unit 25 first connection start instruction information including destination information indicating the wireless communication apparatus 30 and also the response information and the connection procedure available information included in the fourth wireless signal. On the other hand, if it is determined that connection procedure available information is not included in the fourth wireless signal or if it is determined that the wireless communication apparatus 20 is not in proximity to the wireless communication apparatus 30, the determination unit 22 may output to the control unit 25 connection procedure unavailable information indicating that a connection procedure is not possible.

The storage unit 23 stores various types of information necessary for generating the first to fourth wireless signals (for examples, destination information generated by the determination unit 22 or the like), information to be displayed on the notification unit 24, various types of information necessary for a connection procedure (for example, information regarding security setting or the like), various programs, and the like. The notification unit 24 performs, under the control of the control unit 25, display of various types of information, notification by light, notification by vibration, notification by sound, or the like.

Other than controlling each structural element in the wireless communication apparatus 20, the control unit 25 performs the following process. That is, the control unit 25 generates the first wireless signals and outputs them to the communication unit 21 until the first or second discovery information is provided by the determination unit 22. The communication unit 21 transmits the first wireless signals to the surrounding area.

In the case the first discovery information is provided by the determination unit 22, the control unit 25 determines whether response request information is included in the first discovery information. In the case response request information is included in the first discovery information, the control unit 25 generates a probe response signal as the second wireless signal. On the other hand, in the case response request information is not included in the first discovery information (that is, in the case the first wireless signal is a beacon signal), the control unit 25 generates a probe request signal as the second wireless signal. Then, the control unit 25 outputs the generated second wireless signal to the communication unit 21. The communication unit 21 transmits the second wireless signal to the wireless communication apparatus 30.

On the other hand, in the case the second discovery information is provided, the control unit 25 determines whether one of response information and response request information is included in the second discovery information. In the case response request information is included in the second discovery information, the control unit 25 generates a probe response signal, and outputs the signal to the communication unit 21. The communication unit 21 transmits the probe response signal to the wireless communication apparatus 30. On the other hand, in the case response information is included in the second discovery information, the control unit 25 generates the third wireless signals and outputs the signals to the communication unit 21 until the third wireless signal is provided by the determination unit 22. The communication unit 21 transmits the third wireless signal to the wireless communication apparatus 30.

When the third wireless signal is received from the determination unit 22, the control unit 25 generates the fourth wireless signal, and outputs the signal to the communication unit 21. The communication unit 21 transmits the fourth wireless signal to the wireless communication apparatus 30. Then, the control unit 25 starts a connection procedure.

The control unit 25 starts a connection procedure when the first or second connection start instruction information is provided by the determination unit 22.

In the case the connection procedure unavailable information is provided by the determination unit 22, the control unit 25 returns to the process of generating the first wireless signal and outputting the signal to the communication unit 21.

Figure 4:
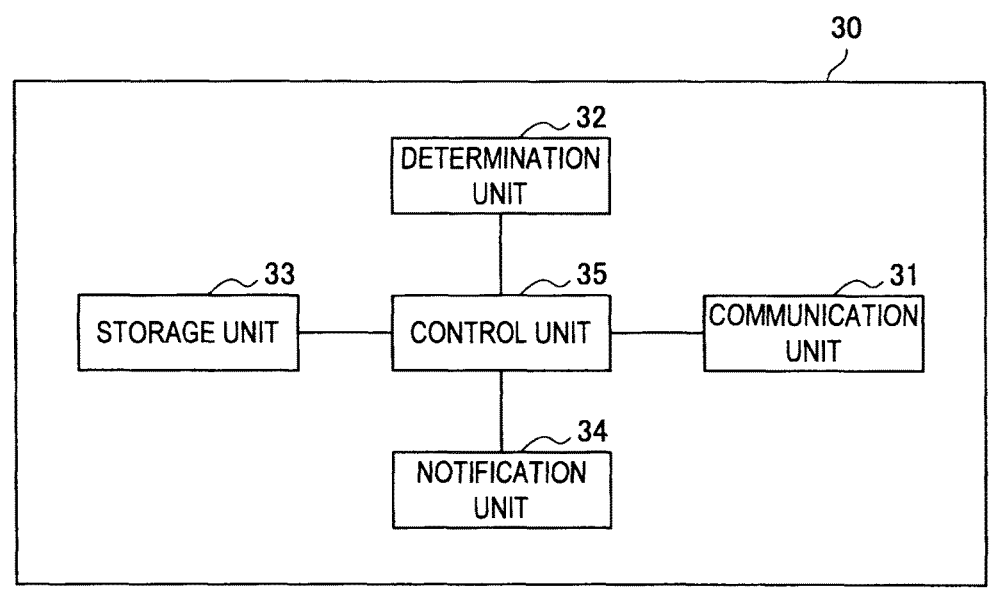
FIG. 4 is a block diagram of the wireless communication apparatus according to the embodiment.

FIG. 4 shows a configuration of the wireless communication apparatus 30. The wireless communication apparatus 30 includes various hardware components such as a CPU, a ROM, a RAM, a communication device, a display, and the like, and performs various processes by the CPU reading and executing programs stored in the ROM. To be specific, the wireless communication apparatus 30 includes a communication unit 31, a determination unit 32, a storage unit 33, a notification unit 34, and a control unit 35. Their functions are the same as those of the wireless communication apparatus 20.

[Data Structures of Third Wireless Signal and Fourth Wireless Signal]

Figure 5:
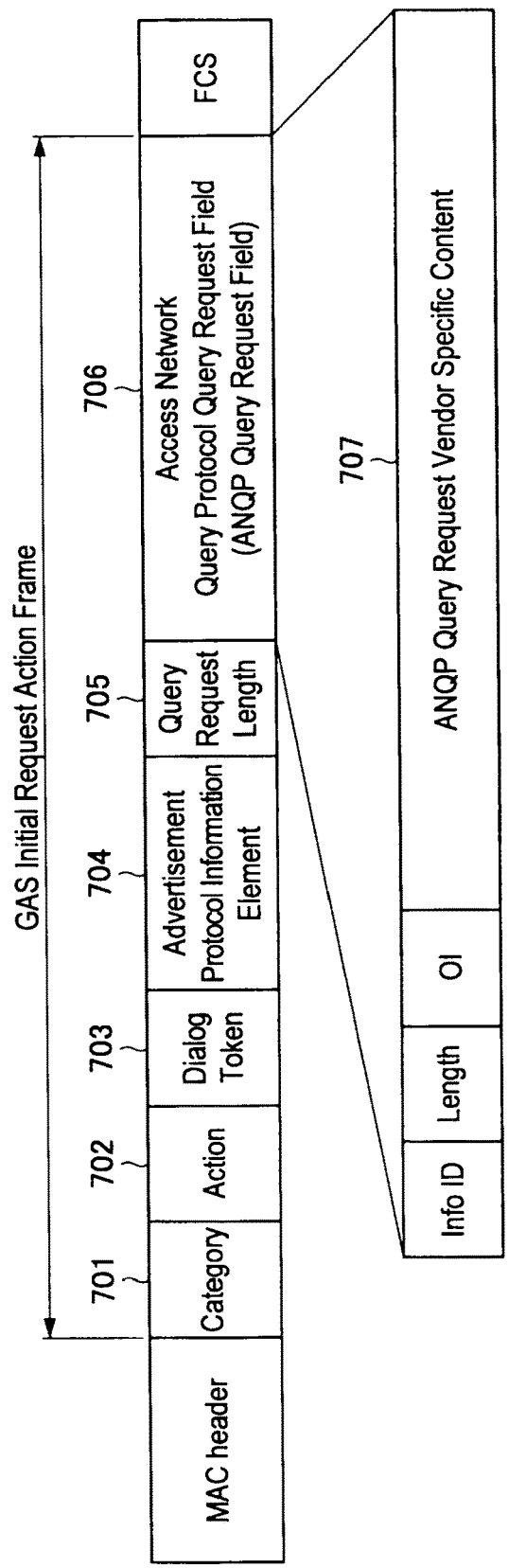
FIG. 5 is an explanatory diagram showing a data structure of a wireless signal.
Figure 6:
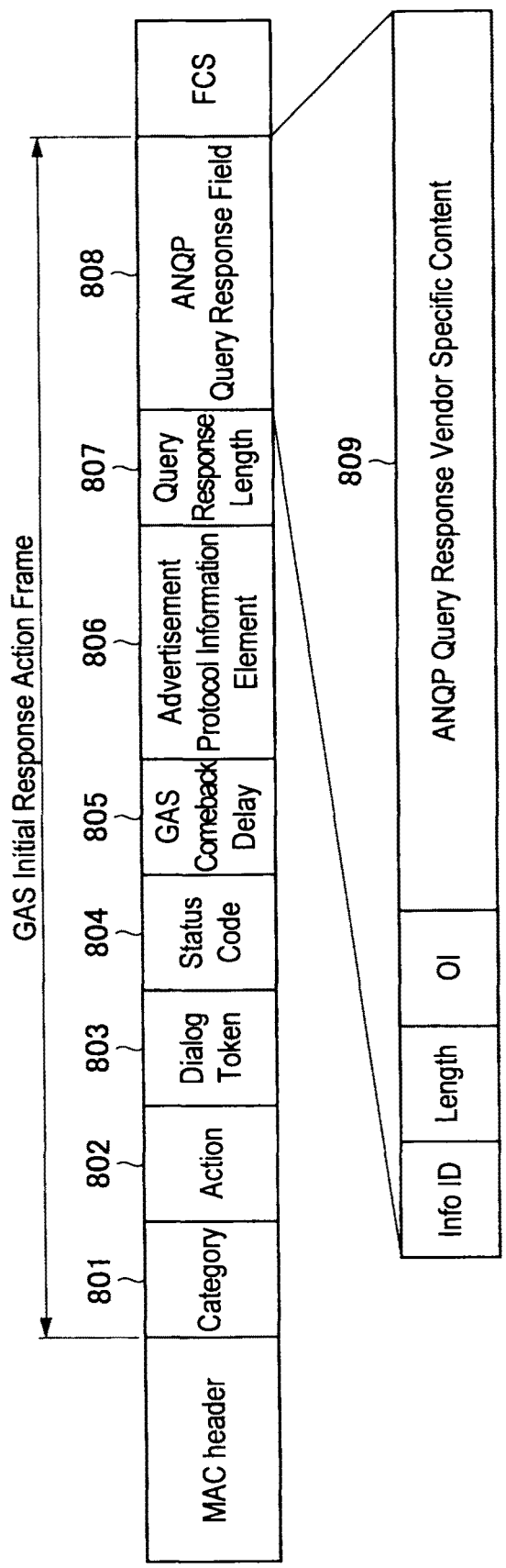
FIG. 6 is an explanatory diagram showing a data structure of a wireless signal.

Next, data structures of service discovery signals used as the third wireless signal and the fourth wireless signal will be described based on FIGS. 5 and 6. As shown in FIGS. 5 and 6, according to the present embodiment, a public action frame is used as the service discovery signal. The public action frame is a type of an action frame, and is a frame defined and expanded in IEEE 802.11k as a management frame that can be transmitted before connection of wireless communication apparatuses.

To be specific, in the present embodiment, a service discovery query signal including a GAS initial request action frame (a generic advertisement services initial request action frame) is used as the third wireless signal. Also, a service discovery response signal including a GAS initial response action frame is used as the fourth wireless signal. These signals are used by Wi-Fi-Direct, for example.

The GAS initial request action frame is defined as a frame that is transmitted to request another wireless communication apparatus for wireless communication. Also, the GAS initial response action frame is defined as a frame that is transmitted to respond to a request from another wireless communication apparatus for wireless communication.

Additionally, in a case the third and fourth wireless signals have large sizes and are fragmented, a GAS comeback request frame and a GAS comeback response frame are also used, but illustration thereof is omitted.

The service discovery query signal is structured from a MAC header frame, a GAS initial request action frame, and a FCS frame. The GAS initial request action frame here includes a category frame 701, an action frame 702, a dialog token frame 703, an advertisement protocol information element frame 704, a query request length frame 705, and an ANQP query request field frame 706.

Information specifying a public action frame is stored in the category frame 701 as the category of a management frame defined in IEEE 802.11. That is, the category frame 701 indicates that the service discovery query signal is a public action frame.

Information specifying a GAS initial request action frame is stored in the action frame 702 as the action type of the public action frame. That is, the action frame 702 indicates that the service discovery query signal is a GAS initial request action frame.

Information for uniquely identifying the service discovery query signal is stored in the dialog token frame 703. Identification information, destination information, and response request information are stored in this dialog token frame 703, for example.

Information indicating an ANQP (Access Network Query Protocol) is stored in the advertisement protocol information element frame 704.

Information indicating the length of the ANQP query request frame 706 is stored in the query request length frame 705.

Information indicating the service protocol type requested by the service discovery query signal is stored in the ANQP query request field frame 706. To be specific, the ANQP query request field frame 706 is structured from an information ID (Info ID) frame, a length frame, an OI frame, and an ANQP query request vendor specific content frame 707. The information indicating the service protocol type requested by the service discovery query signal is stored in the ANQP query request vendor specific content frame 707. Connection procedure available information is stored in this ANQP query request vendor specific content frame 707, for example.

The service discovery response signal is structured from a MAC header frame, a GAS initial response action frame, and a FCS frame. The GAS initial response action frame here includes a category frame 801, an action frame 802, a dialog token frame 803, a status code frame 804, a GAS comeback delay frame 805, an advertisement protocol information element frame 806, a query response length frame 807, and an ANQP query response field frame 808.

Same type of information stored in the category frame 701 is stored in the category frame 801. Information specifying a GAS initial response action frame is stored in the action frame 802 as the action type of the public action frame. That is, the action frame 802 indicates that the service discovery response signal is a GAS initial response action frame.

Information for uniquely identifying the service discovery response signal is stored in the dialog token frame 803. Identification information, destination information, and response information are stored in this dialog token frame 803, for example.

Information indicating the status defined in IEEE 802.11u is stored in the status code frame 804.

Information indicating the delay time of the service discovery response signal is stored in the GAS comeback delay frame 805.

Same type of information stored in the advertisement protocol information element frame 704 is stored in the advertisement protocol information element frame 806.

Information indicating the length of the ANQP query response field frame 808 is stored in the query response length frame 807.

Information indicating the service protocol type requested by the service discovery response signal is stored in the ANQP query response field frame 808. To be specific, the ANQP query response field frame 808 is structured from an information ID frame, a length frame, an OI frame, and an ANQP query response vendor specific content frame 809. Information indicating the service protocol type requested by the service discovery response signal is stored in the ANQP query response vendor specific content frame 809. Connection procedure available information is stored in this ANQP query response vendor specific content frame 809, for example.

[Example of Process of Wireless Communication System 10-1]

Figure 7:
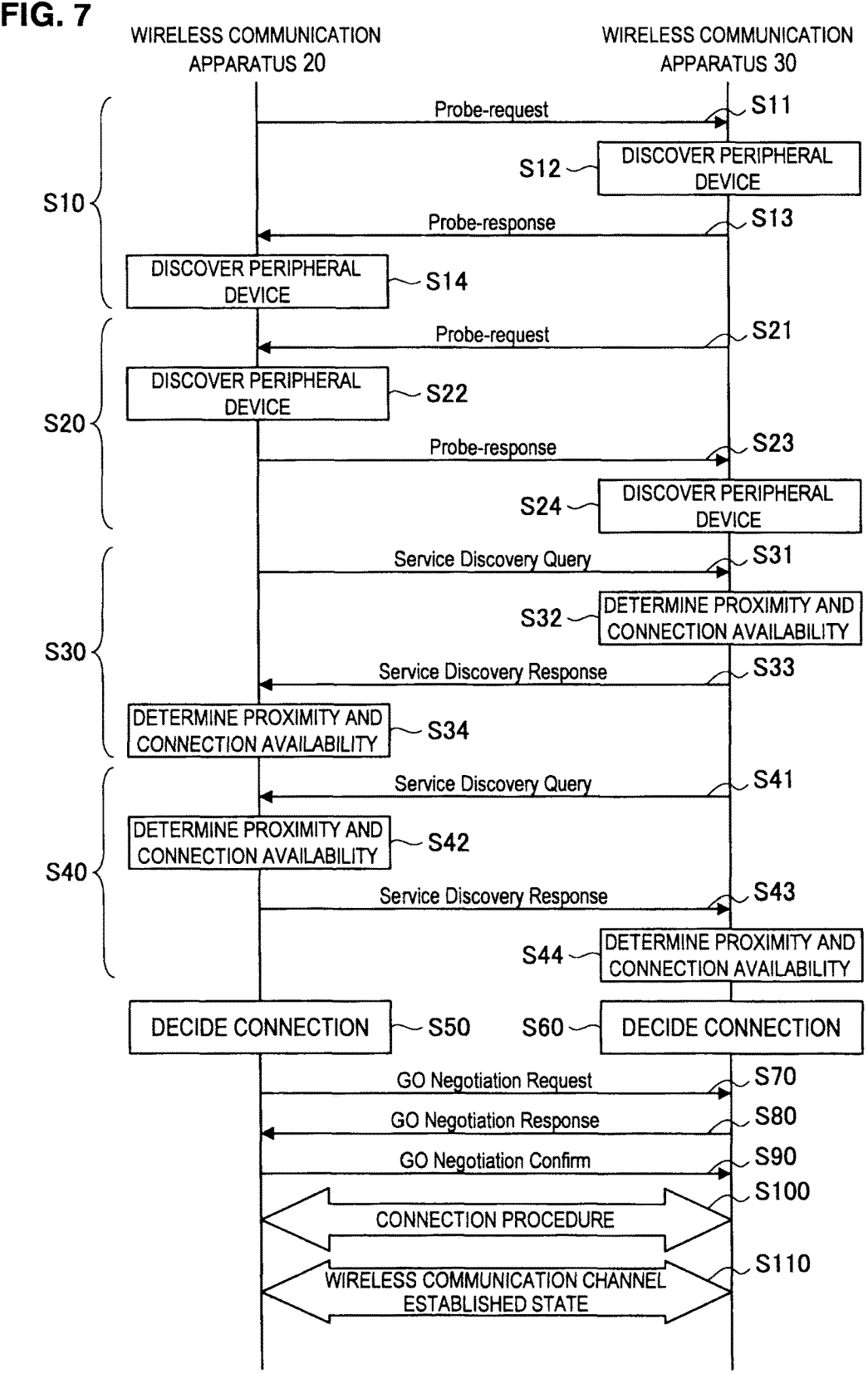
FIG. 7 is a sequence diagram showing steps of a process by the wireless communication system.

Next, an example of a process of the wireless communication system 10-1 will be described based on FIG. 7.

The wireless communication apparatus 20 and the wireless communication apparatus 30 first discover each other by performing the process of step S10 or step S20. First, an explanation will be given on step S10. Step S10 is made up of steps S11 to S14. In step S11, the control unit 25 of the wireless communication apparatus 20 generates a probe request signal as the first wireless signal, and outputs the signal to the communication unit 21. The communication unit 21 transmits the probe request signal to the periphery of the wireless communication apparatus 20. The wireless communication apparatus 20 thereby notifies a wireless communication apparatus 30 existing in the periphery of the wireless communication apparatus 20 of its existence.

In step S12, the communication unit 31 of the wireless communication apparatus 30 receives the probe request signal, and outputs the signal to the determination unit 32.

Next, the determination unit 32 identifies the wireless communication apparatus 20 based on the identification information included in the probe request signal provided by the communication unit 31. The determination unit 32 thereby discovers the wireless communication apparatus 20. The determination unit 32 generates destination information for uniquely specifying the wireless communication apparatus 20 based on the identification information included in the probe request signal, and outputs to the control unit 35 first discovery information including the destination information and response request information included in the probe request signal. Furthermore, the determination unit 32 can measure the reception strength of the probe request signal which has been received.

In step S13, the control unit 35 generates a probe response signal as the second wireless signal, and outputs the signal to the communication unit 31. The communication unit 31 transmits the probe response signal to the wireless communication apparatus 20. On the other hand, the control unit 35 displays on the notification unit 34, based on the destination information included in the first discovery information, information indicating existence of the wireless communication apparatus 20 in its periphery (for example, text information "Wireless communication apparatus 20 discovered." or inclusion in a peripheral device list).

In step S14, the communication unit 21 of the wireless communication apparatus 20 receives the probe response signal, and checks the destination information. As a result, since the destination information indicates the wireless communication apparatus 20, the communication unit 21 outputs the probe response signal to the determination unit 22.

Next, the determination unit 22 identifies the wireless communication apparatus 30 as a wireless communication apparatus 30 existing in the periphery of the wireless communication apparatus 20 based on the identification information included in the probe response signal provided by the communication unit 21. The determination unit 22 thereby discovers the wireless communication apparatus 30. The determination unit generates destination information for uniquely specifying the wireless communication apparatus 30 based on the identification information included in the probe response signal, and outputs to the control unit 25 second discovery information including the destination information and response information included in the probe response signal. The control unit 25 displays on the notification unit 24, based on the destination information included in the second discovery information, information indicating existence of the wireless communication apparatus 30 in its periphery (for example, text information "Wireless communication apparatus 30 discovered."). Then, the wireless communication apparatuses 20 and 30 proceed to the process of step S30 or S40.

Next, an explanation will be given on step S20. Step S20 is made up steps S21 to S24. Step S20 differs from step S10 in that the probe request signal is transmitted from the side of the wireless communication apparatus 30.

First, in step S21, the control unit 35 of the wireless communication apparatus 30 generates a probe request signal as the first wireless signal, and outputs the signal to the communication unit 31. The communication unit 31 transmits the probe request signal to the periphery of the wireless communication apparatus 30. The wireless communication apparatus 30 thereby notifies a wireless communication apparatus 20 existing in the periphery of the wireless communication apparatus 30 of its existence.

In step S22, the communication unit 21 of the wireless communication apparatus 20 receives the probe request signal, and outputs the signal to the determination unit 22.

Next, the determination unit 22 identifies the wireless communication apparatus 30 based on the identification information included in the probe request signal provided by the communication unit 21. The determination unit 22 thereby discovers the wireless communication apparatus 30. The determination unit 22 generates destination information for uniquely specifying the wireless communication apparatus 30 based on the identification information included in the probe request signal, and outputs to the control unit 25 first discovery information including the destination information and response request information included in the probe request signal.

In step S23, the control unit 25 generates a probe response signal as the second wireless signal, and outputs the signal to the communication unit 21. The communication unit 21 transmits the probe response signal to the wireless communication apparatus 30. On the other hand, the control unit 25 displays on the notification unit 24, based on the destination information included in the first discovery information, information indicating existence of the wireless communication apparatus 30 in its periphery (for example, text information "Wireless communication apparatus 30 discovered.").

In step S24, the communication unit 31 of the wireless communication apparatus 30 receives the probe response signal, and checks the destination information. As a result, since the destination information indicates the wireless communication apparatus 30, the communication unit 31 outputs the probe response signal to the determination unit 32.

Next, the determination unit 32 identifies the wireless communication apparatus 20 based on the identification information included in the probe response signal provided by the communication unit 31. The determination unit 32 thereby discovers the wireless communication apparatus 20. The determination unit 32 generates destination information for uniquely specifying the wireless communication apparatus 20 based on the identification information included in the probe response signal, and outputs to the control unit 35 second discovery information including the destination information and response information included in the probe response signal. The control unit 35 displays on the notification unit 34, based on the destination information included in the second discovery information, information indicating existence of the wireless communication apparatus 20 in its periphery (for example, text information "Wireless communication apparatus 20 discovered."). Then, the wireless communication apparatuses 20 and 30 proceed to the process of step S30 or S40.

By performing the process of step S30 or S40, the wireless communication apparatus 20 and the wireless communication apparatus 30 determine that they are in proximity to each other and also determine that connection procedure available information is included in the wireless signals. First, an explanation will be given on step S30. Step S30 is made up of steps S31 to S34. First, in step S31, the control unit 25 generates a service discovery query signal as the third wireless signal, and outputs the signal to the communication unit 21. The communication unit 21 transmits the service discovery query signal to the wireless communication apparatus 30.

In step S32, the communication unit 31 of the wireless communication apparatus 30 receives the service discovery query signal, and checks the destination information. As a result, since the destination information indicates the wireless communication apparatus 30, the communication unit 31 outputs the service discovery query signal to the determination unit 32.

The determination unit 32 measures the reception strength of the service discovery query signal, and in the case the measured reception strength is a predetermined value or higher, determines that the wireless communication apparatus 30 is in proximity to the wireless communication apparatus 20, and in the case the measured reception strength is below the predetermined value, determines that the wireless communication apparatus 30 is not in proximity to the wireless communication apparatus 20.

In the case the wireless communication apparatus 30 is determined to be in proximity to the wireless communication apparatus 20, the determination unit 32 further determines whether connection procedure available information is included in the service discovery query signal, and in the case it is determined that connection procedure available information is included in the service discovery query signal, outputs to the control unit 35 first connection start instruction information including the destination information specifying the wireless communication apparatus 20 and response request information and connection procedure available information included in the service discovery query signal. On the other hand, in the case connection procedure available information is not included in the service discovery query signal or in the case it is determined that the wireless communication apparatus 30 is not in proximity to the wireless communication apparatus 20, the determination unit 32 outputs to the control unit 35 connection procedure unavailable information indicating the a connection procedure is not possible. Additionally, in the present embodiment, connection procedure available information is included in the service discovery query signal, and thus the determination unit 32 outputs the first connection start instruction information if the wireless communication apparatuses 20 and 30 are in proximity to each other (if the distance between them is several centimeters or less).

In step S33, the control unit 35 generates a service discovery response signal as the fourth wireless signal, and outputs the signal to the communication unit 31. The communication unit 31 transmits the service discovery response signal to the wireless communication apparatus 20. Then, the control unit 35 displays on the notification unit 34, based on the first connection start instruction information, information to the effect that the connection destination is decided to be the wireless communication apparatus 20 (for example, text information "Connection destination decided to be wireless communication apparatus 20."). The user of the wireless communication apparatus 30 can thereby perceive the connection destination.

Additionally, in a case connection procedure unavailable information is provided by the determination unit 32, the control unit 35 displays on the notification unit 34 information to that effect (for example, "Connection failure," "Connection based on proximity not possible." or "Not in proximity."), and returns to step S10 or S20.

On the other hand, in step S34, the communication unit 21 of the wireless communication apparatus 20 receives the service discovery response signal, and checks the destination information. As a result, since the destination information indicates the wireless communication apparatus 20, the communication unit 21 outputs the service discovery response signal to the determination unit 22.

The determination unit 22 measures the reception strength of the service discovery response signal, and in the case the measured reception strength is a predetermined value or higher, determines that the wireless communication apparatus 20 is in proximity to the wireless communication apparatus 30, and in the case the measured reception strength is below the predetermined value, determines that the wireless communication apparatus 20 is not in proximity to the wireless communication apparatus 30.

In the case the wireless communication apparatus 20 is determined to be in proximity to the wireless communication apparatus 30, the determination unit 22 further determines whether connection procedure available information is included in the service discovery response signal, and in the case it is determined that connection procedure available information is included in the service discovery response signal, outputs to the control unit 25 second connection start instruction information including the destination information, and response information and connection procedure available information included in the service discovery response signal. On the other hand, in the case connection procedure available information is determined to be not included in the service discovery response signal or in the case it is determined that the wireless communication apparatus 20 is not in proximity to the wireless communication apparatus 30, the determination unit 22 outputs to the control unit 25 connection procedure unavailable information indicating the a connection procedure is not possible. Additionally, in the present embodiment, connection procedure available information is included in the service discovery response signal, and thus the determination unit 22 outputs the second connection start instruction information if the wireless communication apparatuses 20 and 30 are in proximity to each other (if the distance between them is several centimeters or less).

In the case the second connection start instruction information is provided by the determination unit 22, the control unit 25 outputs to the notification unit 24, based on the second connection start instruction information, information to the effect that the connection destination is decided to be the wireless communication apparatus 30 (for example, text information "Connection destination decided to be wireless communication apparatus 30."). The user of the wireless communication apparatus 20 can thereby perceive the connection destination.

On the other hand, in the case the connection procedure unavailable information is provided by the determination unit 22, the control unit 25 displays on the notification unit 24 information to that effect (for example, "Connection failure," "Connection base on proximity not possible." or "Not in proximity."), and returns to step S10 or S20.

Next, an explanation will be given on step S40. Step S40 is made up of steps S41 to S44. Step S40 differs from step S30 in that the service discovery query signal is transmitted from the side of the wireless communication apparatus 30.

First, in step S41, the control unit 35 generates a service discovery query signal as the third wireless signal, and outputs the signal to the communication unit 31. The communication unit 31 transmits the service discovery query signal to the wireless communication apparatus 20.

In step S42, the communication unit 21 of the wireless communication apparatus 20 receives the service discovery query signal, and checks the destination information. As a result, since the destination information indicates the wireless communication apparatus 20, the communication unit 21 outputs the service discovery query signal to the determination unit 22.

The determination unit 22 measures the reception strength of the service discovery query signal, and in the case the measured reception strength is a predetermined value or higher, determines that the wireless communication apparatus 20 is in proximity to the wireless communication apparatus 30, and in the case the measured reception strength is below the predetermined value, determines that the wireless communication apparatus 20 is not in proximity to the wireless communication apparatus 30.

In the case the wireless communication apparatus 20 is determined to be in proximity to the wireless communication apparatus 30, the determination unit 22 further determines whether connection procedure available information is included in the service discovery query signal, and in the case it is determined that connection procedure available information is included in the service discovery query signal, outputs first connection start instruction information to the control unit 25. On the other hand, in the case connection procedure available information is determined to be not included in the service discovery query signal or in the case it is determined that the wireless communication apparatus 30 is not in proximity to the wireless communication apparatus 20, the determination unit 22 outputs to the control unit 25 connection procedure unavailable information indicating the a connection procedure is not possible. Additionally, in the present embodiment, connection procedure available information is included in the service discovery query signal, and thus the determination unit 22 outputs the first connection start instruction information if the wireless communication apparatuses 20 and 30 are in proximity to each other.

In step S43, the control unit 25 generates a service discovery response signal as the fourth wireless signal, and outputs the signal to the communication unit 21. The communication unit 21 transmits the service discovery response signal to the wireless communication apparatus 30. Then, the control unit 25 outputs to the notification unit 24 information to the effect that the connection destination is decided to be the wireless communication apparatus 30, based on the first connection start instruction information. The user of the wireless communication apparatus 20 can thereby perceive the connection destination.

Additionally, in the case connection procedure unavailable information is provided by the determination unit 22, the control unit 25 displays information to that effect on the notification unit 24, and returns to step S10 or step S20.

For its part, in step S44, the communication unit 31 of the wireless communication apparatus 30 receives the service discovery response signal, and checks the destination information. As a result, since the destination information indicates the wireless communication apparatus 30, the communication unit 31 outputs the service discovery response signal to the determination unit 32.

The determination unit 32 measures the reception strength of the service discovery response signal, and in the case the measured reception strength is a predetermined value or higher, determines that the wireless communication apparatus 30 is in proximity to the wireless communication apparatus 20, and in the case the measured reception strength is below the predetermined value, determines that the wireless communication apparatus 30 is not in proximity to the wireless communication apparatus 20.

In the case the wireless communication apparatus 30 is determined to be in proximity to the wireless communication apparatus 20, the determination unit 32 further determines whether connection procedure available information is included in the service discovery response signal, and in the case it is determined that connection procedure available information is included in the service discovery response signal, outputs second connection start instruction information to the control unit 25. On the other hand, in the case connection procedure available information is determined to be not included in the service discovery response signal or in the case it is determined that the wireless communication apparatus 30 is not in proximity to the wireless communication apparatus 20, the determination unit 32 outputs to the control unit 35 connection procedure unavailable information indicating the a connection procedure is not possible. Additionally, in the present embodiment, connection procedure available information is included in the service discovery response signal, and thus the determination unit 32 outputs the second connection start instruction information if the wireless communication apparatuses 20 and 30 are in proximity to each other (if the distance between them is several centimeters or less).

In the case the second connection start instruction information is provided by the determination unit 32, the control unit 35 outputs to the notification unit 34 information to the effect that the connection destination is decided to be the wireless connection apparatus 20, based on the second connection start instruction information. The user of the wireless communication apparatus 30 can thereby perceive the connection destination.

On the other hand, in the case the connection procedure unavailable information is provided by the determination unit 32, the control unit 35 displays on the notification unit 34 information to that effect, and returns to step S10 or S20.

Next, the wireless communication apparatuses 20 and 30 decides in steps S50 and S60 that one another is the other party of a connection procedure, and proceed to steps S70 to S110. A wireless communication channel is established by these processes. First, in step S70, the control unit 25 of the wireless communication apparatus 20 generates a GO negotiation request signal including identification information, destination information specifying the wireless communication apparatus 30, and negotiation request information to the effect that a negotiation regarding master-slave relationship is desired, and outputs the signal to the communication unit 21. The communication unit 21 transmits the GO negotiation request signal to the wireless communication apparatus 30.

In step S80, the communication unit 31 of the wireless communication apparatus 30 receives the GO negotiation request signal, and checks the destination information. As a result, since the destination information indicates the wireless communication apparatus 30, the communication unit 31 outputs the GO negotiation request signal to the control unit 35. When the GO negotiation request signal is provided, the control unit 35 determines whether it wishes to be the master unit or the slave unit, generates a GO negotiation response signal including identification information, destination information specifying the wireless communication apparatus 20, and desired role information indicating the role that it desires, and outputs the signal to the communication unit 31. The communication unit 31 transmits the GO negotiation response signal to the wireless communication apparatus 20.

In step S90, the communication unit 21 of the wireless communication apparatus 20 receives the GO negotiation response signal, and checks the destination information. As a result, since the destination information indicates the wireless communication apparatus 20, the communication unit 21 outputs the GO negotiation response signal to the control unit 25.

The control unit 25 decides whether to accept the wish of the wireless communication apparatus 30 based on the desired role information included in the GO negotiation response signal. The control unit 25 generates a GO negotiation confirm signal including identification information, destination information, and role information indicating its role, and outputs the signal to the communication unit 21. The communication unit 21 transmits the GO negotiation confirm signal to the wireless communication apparatus 30. The control unit 25 displays on the notification unit 24 information to the effect that a connection procedure to the wireless communication apparatus 30 will be started (for example, text information "Negotiation with wireless communication apparatus 30 has successfully completed." or "Connection procedure to wireless communication apparatus 30 will be started.").

Additionally, in the case of deciding to deny the wish of the wireless communication apparatus 30, the control unit 25 returns to step S70.

The communication unit 31 of the wireless communication apparatus 30 receives the GO negotiation confirm signal, and checks the destination information. As a result, since the destination information indicates the wireless communication apparatus 30, the communication unit 31 outputs the GO negotiation confirm signal to the control unit 35. The control unit 35 checks that its wish has been accepted based on the GO negotiation confirm signal. Then, the control unit 35 displays on the notification unit 34 information to the effect that a connection procedure to the wireless communication apparatus 20 will be started (for example, text information "Connection procedure to wireless communication apparatus 20 will be started.").

Accordingly, because the wireless communication apparatuses 20 and 30 notify the users of start of a connection procedure before starting the connection procedure, the users can perceive that the connection procedure is started.

Next, the wireless communication apparatuses 20 and 30 perform the connection procedure in step S100, and establish a wireless communication channel in step S110. The processes of step S100 and S110 are the same as those of related art, and are processes such as a WPS exchange, an authentication procedure, a 4-way handshake and the like that are performed, as shown in FIG. 16, for example, when a WPS push button is pressed at each of the wireless communication apparatuses of related art, for example. The notification units 24 and 34 may issue notifications regarding a change in the status during such a connection procedure. For example, the notification unit 24 of the wireless communication apparatus 20 may, in at least one step among steps S900 to S905 shown in FIG. 16, issue a notification regarding a change in the status. Likewise, the notification unit 34 of the wireless communication apparatus 30 may, in at least one step among steps S800 to S805 shown in FIG. 16, issue a notification regarding a change in the status. That is, the notification unit 24 and the notification unit 34 may issue notifications regarding, for example, whether or not a connection procedure has been started, whether or not authentication has been established, whether or not security has been set, and whether or not a wireless connection has been established and data transmission has been enabled. Furthermore, in the case a connection procedure is performed as shown in FIG. 17, the notification unit 24 of the wireless communication apparatus 20 may, in each of steps S900, S904 and S905, issue a notification to the effect that a connection has been started, a connection procedure is being performed, a procedure has completed or a procedure is not allowed. Likewise, the notification unit 34 of the wireless communication apparatus 30 may, in each of steps S800, S804 and S805, issue a notification to the effect that a connection has been started, a connection procedure is being performed, a procedure has completed or a procedure is not allowed. Additionally, the wireless communication apparatuses 20 and 30 may each cause the notification unit 24 or 34 to display text information such as "Normally connected," but the notification may also be performed in manners other than the display of the text information (for example, by sound, vibration or the like).

As described above, according to the first embodiment, the wireless communication apparatus 20 determines whether it is in proximity to the wireless communication apparatus 30, and if it is determined to be in proximity to the wireless communication apparatus 30, performs a connection procedure to the wireless communication apparatus 30.

Accordingly, the user of the wireless communication apparatus 20 can cause the wireless communication apparatus 20 to perform a connection procedure just by nearing the wireless communication apparatus 20 to the wireless communication apparatus 30, and thus, with the wireless communication apparatus 20, burden placed on the user when connecting wireless communication apparatuses can be reduced.

Furthermore, the wireless communication apparatus 20 determines that it is in proximity to the wireless communication apparatus 30 when reception strength of the third or fourth wireless signal received from the wireless communication apparatus 30 is a predetermined value or higher, and thus whether it is in proximity to the wireless communication apparatus 30 or not can be easily determined.

Furthermore, the wireless communication apparatus 20 performs a connection procedure to the wireless communication apparatus 30 when determining that it is in proximity to the wireless communication apparatus 30 and that connection procedure available information is included in the third or fourth wireless signal, and thus a connection procedure can be more surely performed.

Furthermore, the wireless communication apparatus 20 notifies the user of start of a connection procedure before starting the same, and thus the user can perceive that the connection procedure is started. Since the wireless communication apparatus 20 can perform the connection procedure if it is within the communication range of the wireless communication apparatus 30, the user of the wireless communication apparatus 20 can, after checking the start of the connection procedure, separate the wireless communication apparatus 20 from the wireless communication apparatus 30 within the communication range of the wireless communication apparatus 30. Additionally, in related art, users were not notified of start of the connection procedure and could not know at which timing the connection procedure was started, and as a result, wireless communication apparatuses had to be kept in proximity until the connection procedure ended. In this manner, the wireless communication apparatus 20 can reduce, compared to related art, the burden placed on a user when connecting wireless communication apparatuses to each other.

[Modified Example]

Next, a modified example of the first embodiment will be described. This modified example assumes a case in which a plurality of wireless communication apparatuses 30 are present in the periphery of the wireless communication apparatus 20. According to this modified example, the determination unit 22 performs the following process in step S34 described above.

The determination unit 22 measures (calculates) the reception strength, for each transmission source, of received signals from a plurality of transmission sources provided by the communication unit 21. In the case there are several transmission sources with the reception strength of a predetermined value or higher, the determination unit 22 may determine the transmission source that can be determined to be the most proximate (that is, the transmission source with the highest reception strength), among the transmission sources, as a proximate connection destination and select the same.

As a method for determining proximity, the reception strength may be divided into several ranks. For example, it may be ranked into "very far," "proximity," and "extreme proximity," and when it is determined to be "very far," the transmission source terminal may be removed from a connection destination candidate list.

Also, as in FIG. 2B, first, filtering may be performed based on whether a proximity connection function is possessed, and then whether it is in proximity or not may be determined for the devices.

Accordingly, the user of the wireless communication apparatus 20 can start a connection procedure to a wireless communication apparatus 30 to which connection is desired, among a plurality of wireless communication apparatuses 30, by nearing the wireless communication apparatus 20 closest to the wireless communication apparatus 30, and thus, with the wireless communication apparatus 20, burden placed on the user when connecting the wireless communication apparatuses to each other can be reduced compared to related art.

2. Second Embodiment

[Configuration of Wireless Communication System]

Figure 8:
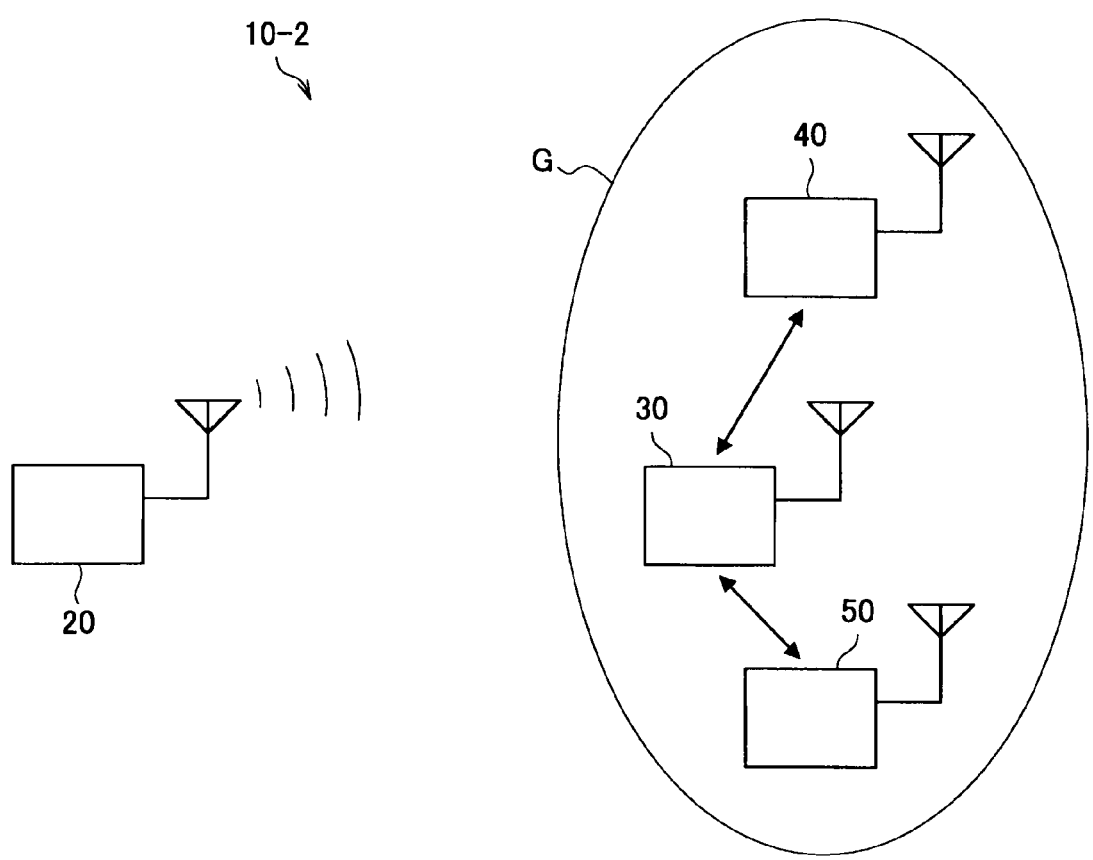
FIG. 8 is a block diagram showing a wireless communication system according to a second embodiment of the present disclosure.

First, a configuration of a wireless communication system 10-2 will be described based on FIG. 8. The wireless communication system 10-2 includes wireless communication apparatuses 20 to 50. Configurations of the wireless communication apparatuses 40 and 50 are the same as those of the wireless communication apparatuses 20 and 30. The wireless communication apparatus 30 forms a group G with the wireless communication apparatuses 40 and 50, and functions as a master unit of this group. In the second embodiment, the wireless communication apparatus 20 not belonging to any group performs a process of connecting to the wireless communication apparatus 30.

[Example of Process of Wireless Communication System 10-2]

Figure 9:
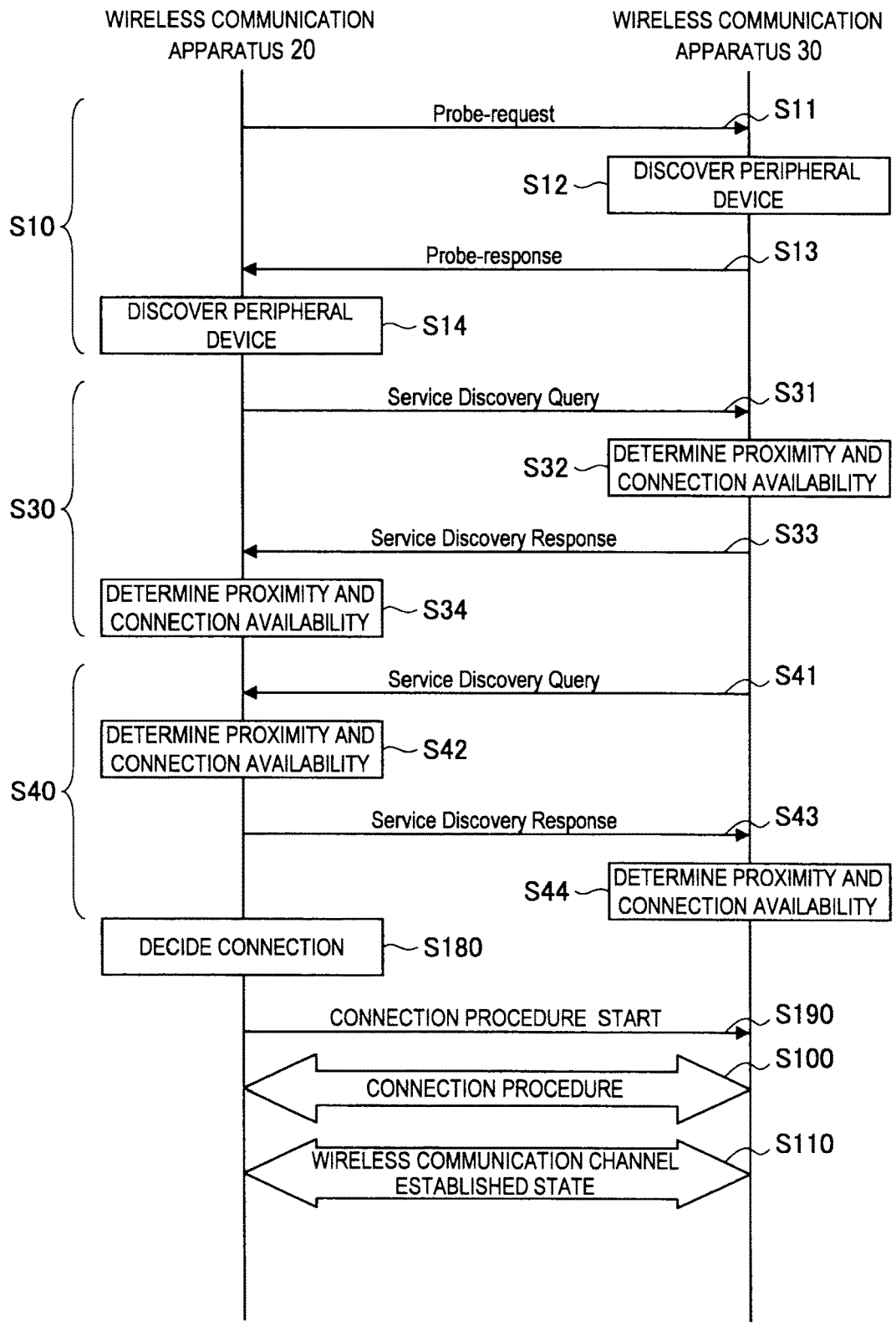
FIG. 9 is a sequence diagram showing steps of a process by the wireless communication system.

Next, an example of a process of the wireless communication system 10-2 will be described based on FIG. 9. The wireless communication apparatus 20 and the wireless communication apparatus 30 first discover each other by performing the process of step S10 described above.

Next, the wireless communication apparatus 20 and the wireless communication apparatus 30 determine, by performing step S30 or S40 described above, that they are in proximity to each other and that connection is possible.

Next, in step S180, the wireless communication apparatus 20 decides the wireless communication apparatus 30 as the connection target. Then, in step S190, the wireless communication apparatus 20 generates a connection start trigger signal including identification information, destination information indicating the wireless communication apparatus 30, and connection start request information to the effect the a connection procedure will be started, and outputs the signal to the communication unit 21. The communication unit 21 outputs the connection start trigger signal to the wireless communication apparatus 30. The communication unit 31 of the wireless communication apparatus 30 receives the connection start trigger signal, and checks the destination information. As a result, since the destination information indicates the wireless communication apparatus 30, the communication unit 31 outputs the connection start trigger signal to the control unit 35. The control unit 35 perceives that the wireless communication apparatus 20 wishes to start connection, based on the connection start trigger signal. Then, the wireless communication apparatuses 20 and 30 perform connection by performing the processes of step S100 and S110 described above. The same effect as the first embodiment can be obtained also by the second embodiment.

[First Modified Example]

Figure 10:
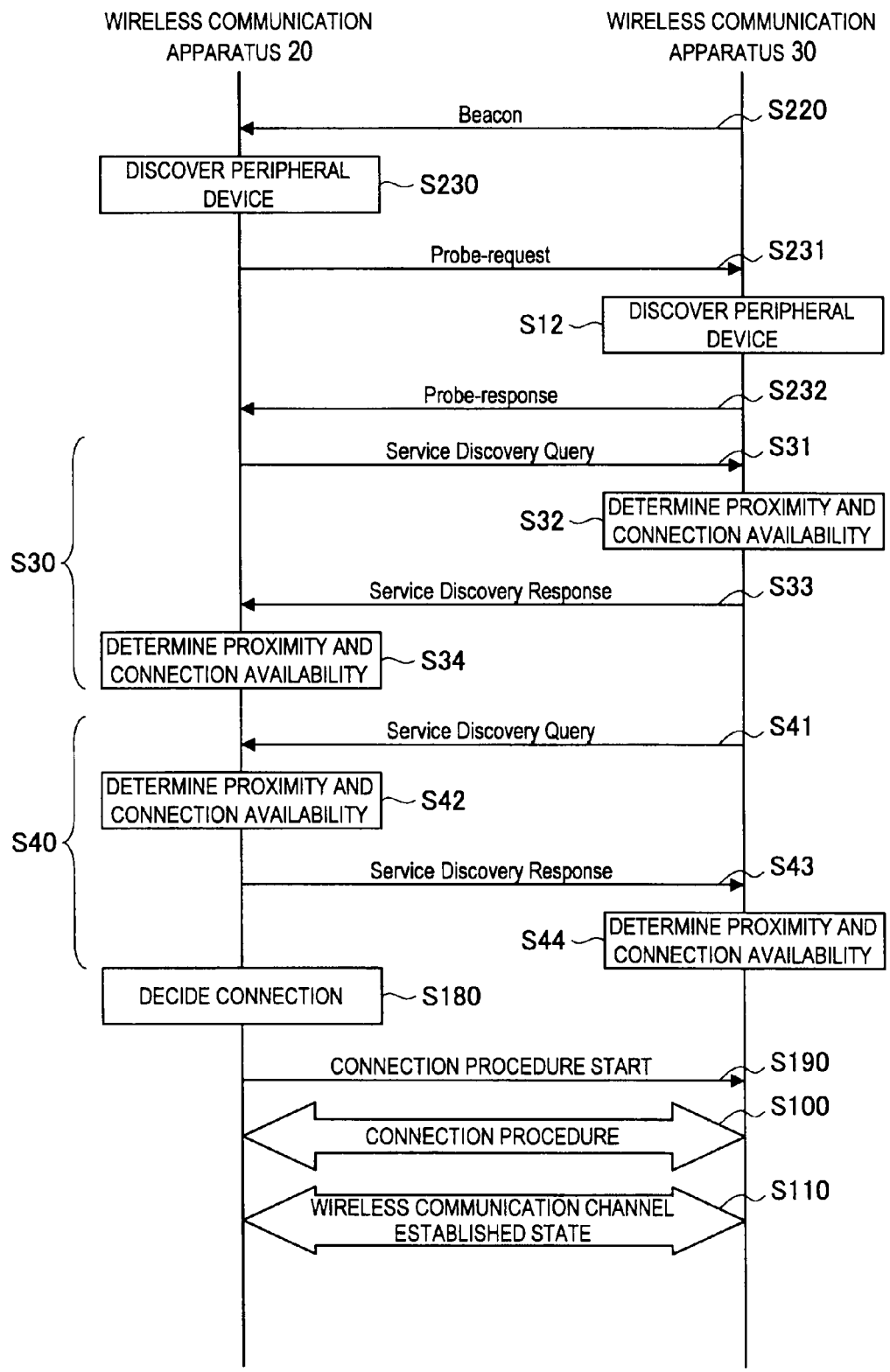
FIG. 10 is a sequence diagram showing steps of a process by the wireless communication system.

Next, a first modified example of the second embodiment will be described based on FIG. 10. As shown in FIG. 10, the first modified example is different from the process described above in the process of the wireless communication apparatus 20 and the wireless communication apparatus 30 for discovering each other.

That is, in step S220, the control unit 35 of the wireless communication apparatus 30 generates a beacon signal as the first wireless signal, and outputs the signal to the communication unit 31. The communication unit 31 transmits the beacon signal to the periphery of the wireless communication apparatus 30. The wireless communication apparatus 30 thereby notifies a wireless communication apparatus 20 existing in the periphery of the wireless communication apparatus 30 of its existence.

In step S230, the communication unit 21 of the wireless communication apparatus 20 receives the beacon signal, and outputs the same to the determination unit 22.

Next, the determination unit 22 identifies the wireless communication apparatus 30 based on the identification information included in the beacon signal provided by the communication unit 21. The determination unit 22 thereby discovers the wireless communication apparatus 30. The determination unit 22 generates destination information for uniquely specifying the wireless communication apparatus 30, based on the identification information included in the beacon signal, and outputs to the control unit 25 first discovery information including the destination information.

Then, in step S231, the wireless communication apparatus 20 transmits a probe request signal to the wireless communication apparatus 30, and the wireless communication apparatus 30, in response, performs the process of step S12. The wireless communication apparatus 30 transmits, in step S232, a probe response signal to the wireless communication apparatus 20. Then, the wireless communication apparatuses 20 and 30 perform connection by performing steps S30, S40, S180, S190, S100, and S110 described above. The same effect as the first embodiment can also be obtained by the first modified example.

[Second Modified Example]

Figure 11:
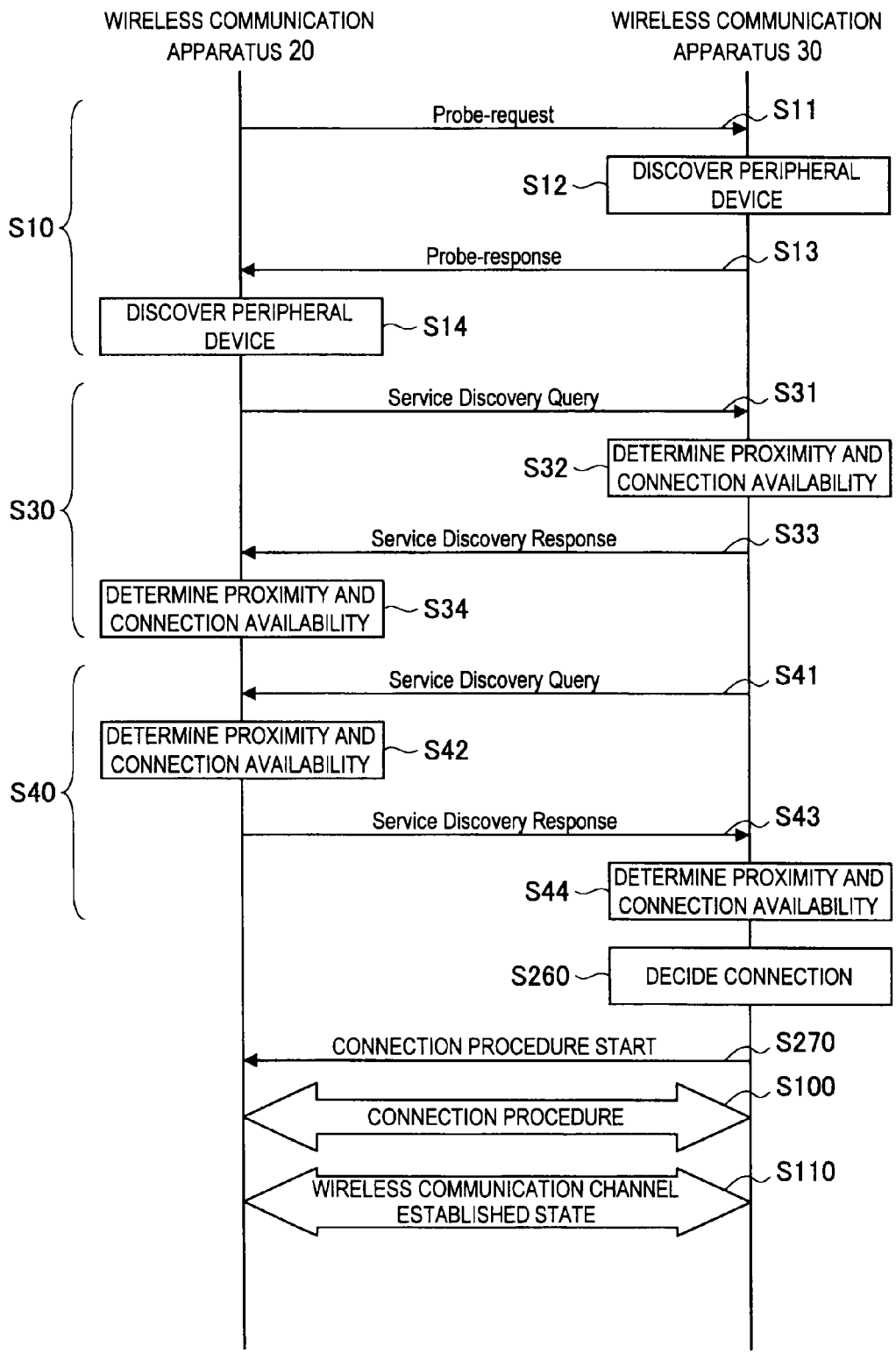
FIG. 11 is a sequence diagram showing steps of a process by the wireless communication system.

Next, a second modified example of the second embodiment will be described based on FIG. 11. As shown in FIG. 11, the second modified example differs from the process described above in that the connection start trigger signal is transmitted from the side of the wireless communication apparatus 30. That is, the wireless communication apparatuses 20 and 30 first perform the processes of steps S10, S30, and S40 described above. Then, in step S260, the wireless communication apparatus 30 decides the wireless communication apparatus 20 to be the connection target. Then, in step S270, the wireless communication apparatus 30 generates a connection start trigger signal including identification information, destination information indicating the wireless communication apparatus 20, and connection start request information to the effect the a connection procedure will be started, and outputs the signal to the communication unit 31. The communication unit 31 outputs the connection start trigger signal to the wireless communication apparatus 20. The communication unit 21 of the wireless communication apparatus 20 receives the connection start trigger signal, and checks the destination information. As a result, since the destination information indicates the wireless communication apparatus 20, the communication unit 21 outputs the connection start trigger signal to the control unit 25. The control unit 25 perceives that the wireless communication apparatus 30 wishes to start connection, based on the connection start trigger signal. Then, the wireless communication apparatuses 20 and 30 perform connection by performing the processes of step S100 and S110 described above. The same effect as the first embodiment can be obtained also by the second modified example.

3. Third Embodiment

Next, a third embodiment will be described. According to the third embodiment, a wireless communication apparatus 20 connects, in the wireless communication system 10-2 shown in FIG. 8, to a wireless communication apparatus 40, which is a slave unit in a group G.

Figure 12:
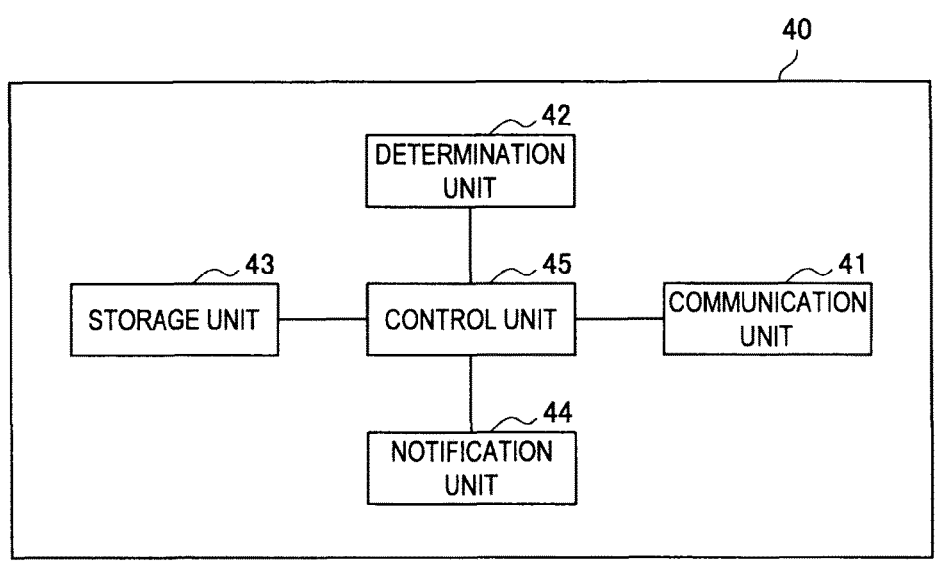
FIG. 12 is a block diagram showing a wireless communication apparatus according to a third embodiment of the present disclosure.

As shown in FIG. 12, the wireless communication apparatus 40 includes a communication unit 41, a determination unit 42, a storage unit 43, a notification unit 44, and a control unit 45. Functions of these elements are the same as those of the wireless communication apparatus 20.

[Steps of Process of Wireless Communication System 10-2]

Figure 13:
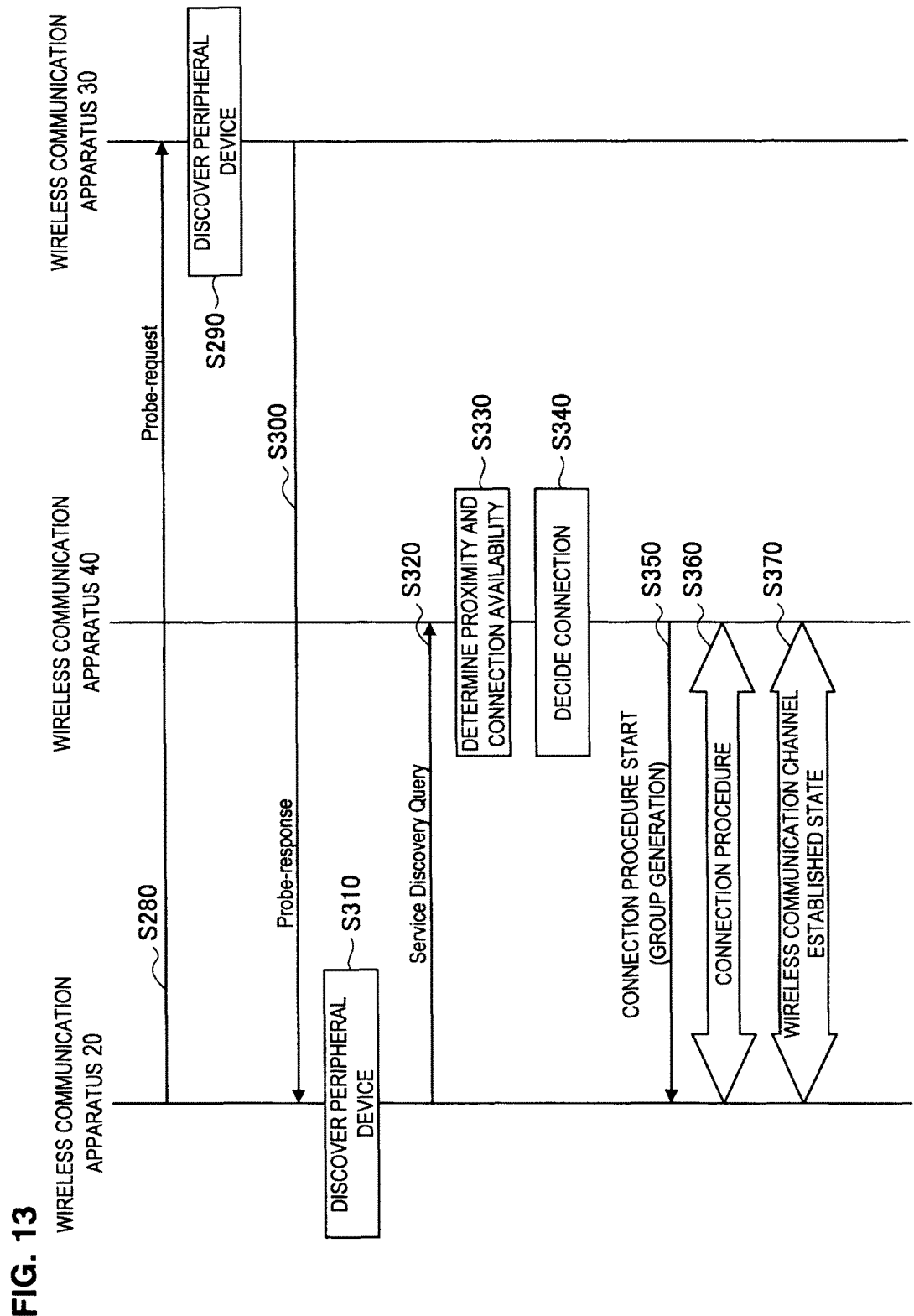
FIG. 13 is a sequence diagram showing steps of a process by the wireless communication system.

Next, an example of a process of a wireless communication system 10-2 according to the third embodiment will be described based on FIG. 13.

In step S280, the control unit 25 of the wireless communication apparatus 20 generates a probe request signal as the first wireless signal, and outputs the signal to the communication unit 21. The communication unit 21 transmits the probe request signal to the periphery of the wireless communication apparatus 20. The wireless communication apparatus 20 thereby notifies a wireless communication apparatus 30 existing in the periphery of the wireless communication apparatus 20 of its existence.

In step S290, the communication unit 31 of the wireless communication apparatus 30 receives the probe request signal, and outputs the signal to the determination unit 32.

Next, the determination unit 32 identifies the wireless communication apparatus 20 based on the identification information included in the probe request signal provided by the communication unit 31. The determination unit 32 thereby discovers the wireless communication apparatus 20. The determination unit 32 generates destination information for uniquely specifying the wireless communication apparatus 20, based on the identification information included in the probe request signal, and outputs to the control unit 35 first discovery information including the destination information and request response information included in the probe request signal.

In step S300, the control unit 35 generates a probe response signal as the second wireless signal, and outputs the signal to the communication unit 31. Here, the control unit 35 includes, in the probe response signal, list information indicating a list of slave units (in this case, wireless communication apparatuses 40 and 50). The list information is a combination of pieces of destination information indicating the wireless communication apparatuses 40 and 50, for example. These pieces of destination information have been generated in the course of connection of the wireless communication apparatus 30 to the wireless communication apparatuses 40 and 50. The communication unit 31 transmits the probe response signal to the wireless communication apparatus 20. On the other hand, the control unit 35 displays on the notification unit 34, based on the destination information included in the first discovery information, information indicating existence of the wireless communication apparatus 20 in its periphery (for example, text information "Wireless communication apparatus 20 discovered.").

In step S300, the communication unit 21 of the wireless communication apparatus 20 receives the probe response signal, and checks the destination information. As a result, since the destination information indicates the wireless communication apparatus 20, the communication unit 21 outputs the probe response signal to the determination unit 22.

Then, the determination unit 22 identifies the wireless communication apparatuses 30 to 50 based on the identification information and the list information included in the probe response signal provided by the communication unit 21. The determination unit 22 thereby discovers the wireless communication apparatuses 30 to 50. The determination unit 22 generates destination information for uniquely specifying the wireless communication apparatuses 30 to 50, and outputs to the control unit 25 second discovery information including the destination information and response information. The control unit 25 displays on the notification unit 24, based on the second discovery information, information indicating that the wireless communication apparatuses 30 to 50 are present in its periphery (for example, text information "Wireless communication apparatuses 30 to 50 discovered.").

In step S320, to attempt to connect to the wireless communication apparatus 40, which is a slave unit, the control unit 25 generates a service discovery query signal including destination information indicating the wireless communication apparatus 40, and outputs the signal to the communication unit 21. The communication unit 21 transmits the service discovery query signal to the wireless communication apparatus 40.

In step S330, the communication unit 41 of the wireless communication apparatus 40 receives the service discovery query signal, and checks the destination information. As a result, since the destination information indicates the wireless communication apparatus 40, the communication unit 41 outputs the service discovery query signal to the determination unit 42.

The determination unit 42 measures the reception strength of the service discovery query signal, and in the case the measured reception strength is a predetermined value or higher, determines that the wireless communication apparatus 40 is in proximity to the wireless communication apparatus 20, and in the case the measured reception strength is below the predetermined value, determines that the wireless communication apparatus 40 is not in proximity to the wireless communication apparatus 20.

In the case the wireless communication apparatus 40 is determined to be in proximity to the wireless communication apparatus 20, the determination unit 42 further determines whether connection procedure available information is included in the service discovery query signal, and in the case connection procedure available information is determined to be included in the service discovery query signal, outputs to the control unit 45 first connection start instruction information including the destination information indicating the wireless communication apparatus 20 and response request information and connection procedure available information included in the service discovery query signal. On the other hand, in the case connection procedure available information is determined to be not included in the service discovery query signal or in the case the wireless communication apparatus 40 is determined to be not in proximity to the wireless communication apparatus 20, the determination unit 42 outputs to the control unit 45 connection procedure unavailable information indicating that a connection procedure is not possible. Additionally, in the third embodiment, connection procedure available information is included in the service discovery query signal, and thus the determination unit 42 outputs the first connection start instruction information if the wireless communication apparatuses 40 and 20 are in proximity to each other (if the distance between them is several centimeters or less).

In the case the first connection start instruction information is provided by the determination unit 42, the control unit 45 outputs to the notification unit 44, based on the first connection start instruction information, information to the effect that the connection destination is decided to be the wireless communication apparatus 20. The user of the wireless communication apparatus 40 can thereby perceive the connection destination.

On the other hand, in the case the connection procedure unavailable information is provided by the determination unit 42, the control unit 45 displays on the notification unit 44 information to that effect, and repeats the process of step S330.

Next, in step S340, the control unit 45 decides the wireless communication apparatus 20 as the connection destination.

In step S350, the wireless communication apparatus 40 generates a connection start trigger signal including identification information, destination information indicating the wireless communication apparatus 20, and connection start request information to the effect that a connection procedure will be started (that is, to the effect that the wireless communication apparatus 20 will be included in the group G), and outputs the signal to the communication unit 41. The communication unit 41 outputs the connection start trigger signal to the wireless communication apparatus 20. The communication unit 21 of the wireless communication apparatus 20 receives the connection start trigger signal, and checks the destination information. As a result, since the destination information indicates the wireless communication apparatus 20, the communication unit 21 outputs the connection start trigger signal to the control unit 25. The control unit 25 perceives, based on the connection start trigger signal, that the wireless communication apparatus 40 wishes to start connection. Then, the wireless communication apparatuses 20 and 40 perform connection by performing, in steps S360 and S370, the same processes as steps S100 and S110.

As described above, according to the third embodiment, in addition to the effect same as that of the first embodiment, the following effect can be obtained. Specifically, since the wireless communication apparatus 30 includes list information indicating a list of slave units in a probe response signal, the wireless communication apparatus 20 can grasp wireless communication apparatus(es) forming a group G based on the list information. As a result, the wireless communication apparatus 20 can attempt to connect to any wireless communication apparatus in the group G. In the above explanation, the wireless communication apparatus 20 attempts to connect to the wireless communication apparatus 40, but it may also attempt connection to the wireless communication apparatus 50.

[First Modified Example]

Figure 14:
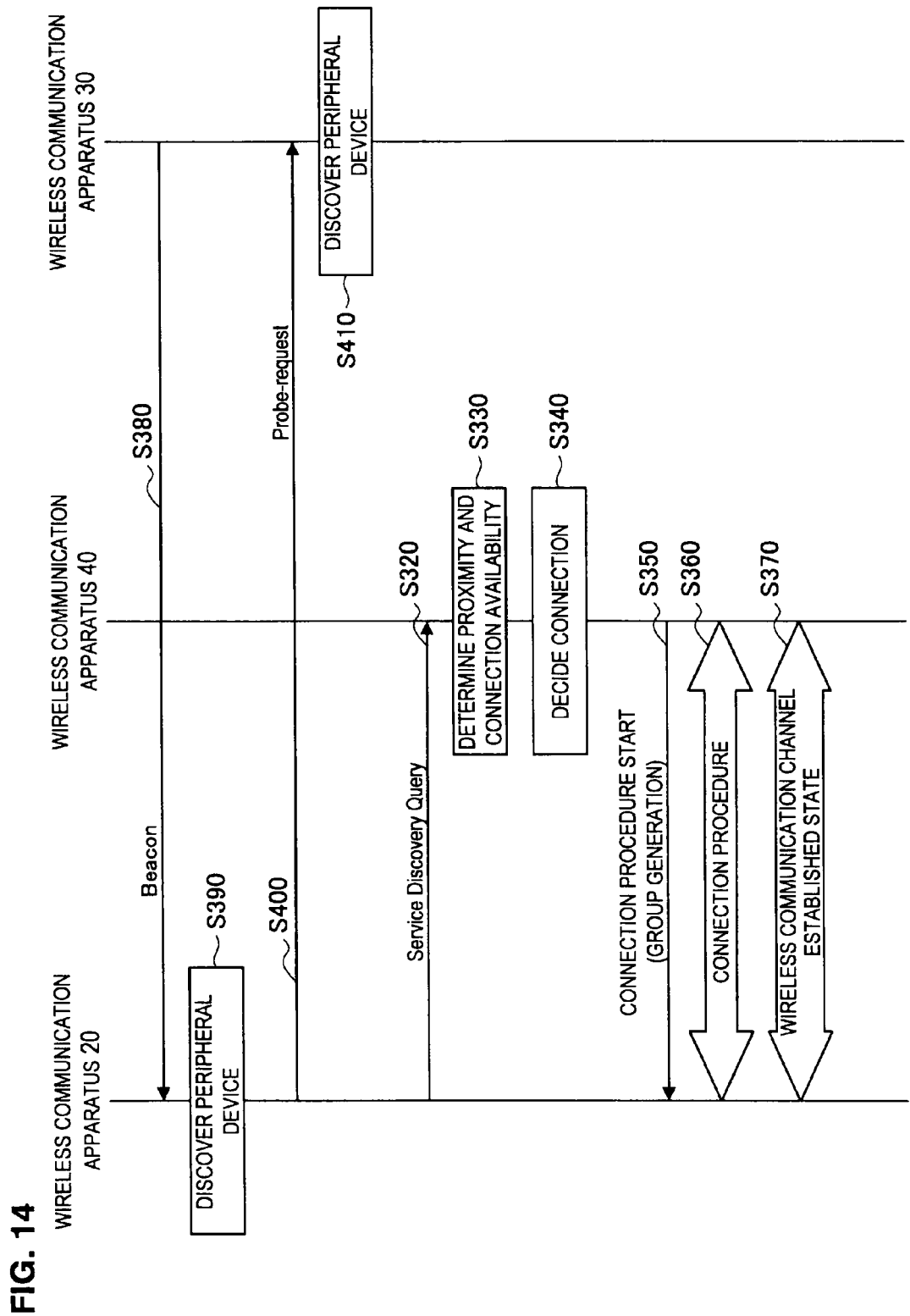
FIG. 14 is a sequence diagram showing steps of a process by the wireless communication system.

Next, a first modified example of the third embodiment will be described based on FIG. 14. In step S380, the control unit 35 of the wireless communication apparatus 30 generates a beacon signal as the first wireless signal, and outputs the signal to the communication unit 31. In the modified example, the list information described above is included in the beacon signal. The communication unit 31 transmits the beacon signal to the periphery of the wireless communication apparatus 30. The wireless communication apparatus 30 thereby notifies a wireless communication apparatus 20 existing in the periphery of the wireless communication apparatus 30 of its existence.

In step S390, the communication unit 21 of the wireless communication apparatus 20 receives the beacon signal, and outputs the signal to the determination unit 22.

Next, the determination unit 22 identifies the wireless communication apparatuses 30 to 50 based on the identification information and the list information included in the beacon signal provided by the communication unit 21. The determination unit 22 thereby discovers the wireless communication apparatuses 30 to 50. Then, the determination unit 22 generates destination information for uniquely specifying the wireless communication apparatuses 30 to 50, and outputs to the control unit 25 first discovery information including the destination information.

In step S400, the control unit 25 generates a probe request signal, and outputs the signal to the communication unit 21. The communication unit 21 transmits the probe request signal to the periphery of the wireless communication apparatus 20. The wireless communication apparatus 20 thereby notifies the wireless communication apparatuses 30 to 50 existing in the periphery of the wireless communication apparatus 20 of its existence. In step S410, the wireless communication apparatus 30 receives the probe request signal, and discovers the wireless communication apparatus 20 based on the identification included in the probe request signal.

Then, the wireless communication apparatuses 20 and 40 perform the processes of steps S320 to S370 described above. The same effect as the third embodiment described above can be obtained also by this first modified example.

[Second Modified Example]

Figure 15:
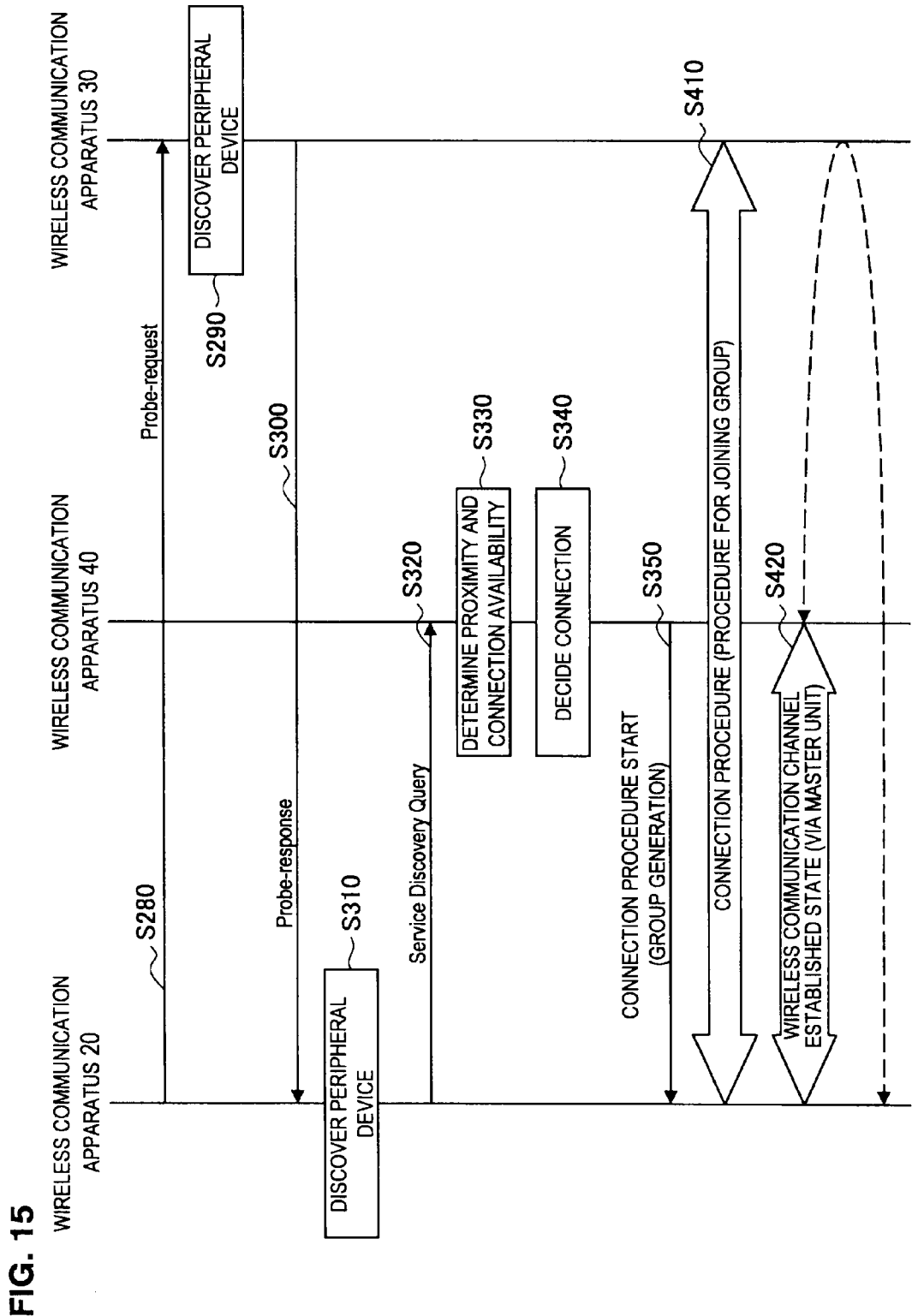
FIG. 15 is a sequence diagram showing steps of a process by the wireless communication system.

Next, a second modified example of the third embodiment will be described based on FIG. 15. According to the second modified example, a wireless communication apparatus 20 connects to a wireless communication apparatus 40 via a wireless communication apparatus 30 which is the master unit.

First, the wireless communication apparatuses 20 to 40 perform the processes of steps S280 to S350 described above.

Next, in step S410, the wireless communication apparatus 20 performs, with respect to the wireless communication apparatus 30, which is the master unit of the wireless communication apparatus 40, a connection procedure for the wireless communication apparatus 20 to join the group G. A wireless communication channel is thereby established in step S420 between the wireless communication apparatus 20 and the wireless communication apparatus 40 via the wireless communication apparatus 30. Additionally, a known process is adopted as appropriate as the process of step S410.

[Third Modified Example]

Next, a third modified example of the third embodiment will be described. According to this modified example, the processes of steps S330 to S350 described above are performed by the wireless communication apparatus 20. Specifically, when a service discovery query signal is received in step S320, the wireless communication apparatus 40 transmits a corresponding service discovery response signal to the wireless communication apparatus 20.

Then, the communication unit 21 of the wireless communication apparatus 20 receives the service discovery response signal, and checks the destination information. As a result, since the destination information indicates the wireless communication apparatus 20, the communication unit 21 outputs the service discovery response signal to the determination unit 22.

The determination unit 22 measures the reception strength of the service discovery response signal, and in the case the measured reception strength is a predetermined value or higher, determines that the wireless communication apparatus 20 is in proximity to the wireless communication apparatus 40, and in the case the measured reception strength is below the predetermined value, determines that the wireless communication apparatus 20 is not in proximity to the wireless communication apparatus 40.

In the case the wireless communication apparatus 20 is determined to be in proximity to the wireless communication apparatus 40, the determination unit 22 further determines whether connection procedure available information is included in the service discovery response signal, and in the case connection procedure available information is determined to be included in the service discovery response signal, outputs to the control unit 25 second connection start instruction information including destination information indicating the wireless communication apparatus 40, and response information and connection procedure available information included in the service discovery response signal. On the other hand, if it is determined that connection procedure available information is not included in the service discovery response signal or if it is determined that the wireless communication apparatus 20 is not in proximity to the wireless communication apparatus 40, the determination unit 22 outputs to the control unit 25 connection procedure unavailable information indicating the a connection procedure is not possible.

In the case the second connection start instruction information is provided by the determination unit 22, the control unit 25 outputs to the notification unit 24 information to the effect that the connection destination is decided to be the wireless connection apparatus 40, based on the second connection start instruction information. The user of the wireless communication apparatus 20 can thereby perceive the connection destination.

On the other hand, in the case the connection procedure unavailable information is provided by the determination unit 22, the control unit 25 displays information to that effect on the notification unit 24.

Next, the control unit 25 decides the wireless communication apparatus 40 as the connection destination. Then, the wireless communication apparatus 20 generates a connection start trigger signal including identification information, destination information indicating the wireless communication apparatus 40, and connection start request information to the effect the a connection procedure will be started, and outputs the signal to the communication unit 21. The communication unit 21 transmits the connection start trigger signal to the wireless communication apparatus 40. The communication unit 41 of the wireless communication apparatus 40 receives the connection start trigger signal, and checks the destination information. As a result, since the destination information indicates the wireless communication apparatus 40, the communication unit 41 outputs the connection start trigger signal to the control unit 45. The control unit 45 perceives that the wireless communication apparatus 20 wishes to start connection, based on the connection start trigger signal. Then, the wireless communication apparatuses 20 and 40 perform connection by performing the processes of step S360 and S370 described above. The same effect as the embodiment described above can be obtained also by the third modified example. Also, proximity and availability of connection can be determined on the side of the wireless communication apparatus 20.

4. Supplement

It should be understood by those skilled in the art that various modifications, combinations, sub-combinations and alterations may occur depending on design requirements and other factors insofar as they are within the scope of the appended claims or the equivalents thereof.

For example, various notifications are presented to the user by using information, but various notifications may also be presented to the user in other manners, for example, by using light, sound, speech, vibration, and the like. In the case of issuing notifications in these manners, the wireless communication apparatus 20 issues the notifications by changing the way the light flashes, the tempo of the sound and speech, and the manner of vibration.

Furthermore, the wireless communication apparatuses 20 and 30 perform determination of whether the wireless communication apparatus 20 and the wireless communication apparatus 30 are brought into proximity to each other by using the reception strength of wireless signals, but the determination may be performed by using other evaluation values such as an evaluation value that is obtained by performing filtering on the reception strength of wireless signals, for example.

[Modified Example of Proximity Detection Method]

Furthermore, the wireless communication apparatus 20 may determine proximity by a combination of a sensor, such as an accelerometer, a gyro sensor, a presence sensor, an ultrasonic sensor, a brightness sensor, a proximity sensor, a temperature sensor, an image sensor or a geomagnetic sensor, and reception strength which has been measured. In the following, examples of the combination will be described. Additionally, the following examples may be applied, singly or together, also to the wireless communication apparatus 30.

Example 1: Combination of Accelerometer and Reception Strength

The wireless communication apparatus 20 may determine that the wireless communication apparatus 30 is in proximity, in the case it is detected by an accelerometer that the wireless communication apparatus 20 is shaken and the reception strength from the wireless communication apparatus 30 is a predetermined value or higher.

Example 2: Combination of Gyro Sensor and Reception Strength

The wireless communication apparatus 20 may determine that the wireless communication apparatus 30 is in proximity, in the case it is perceived, by the change in the direction detected by a gyro sensor, that a user operation set in advance has been performed and the reception strength from the wireless communication apparatus 30 is a predetermined value or higher.

Example 3: Combination of Brightness Sensor and Reception Strength

The wireless communication apparatus 20 may determine that the wireless communication apparatus 30 is in proximity, in the case a light of a predetermined brightness or higher is detected by a brightness sensor and the reception strength from the wireless communication apparatus 30 is a predetermined value or higher. According to such a configuration, a proximity determination can be obtained in the case the wireless communication apparatus 30 is present in the proximity of the wireless communication apparatus 20 and the wireless communication apparatus 30 has an LED lit, for example. Additionally, the wireless communication apparatus 20 may also determine that the wireless communication apparatus 30 is in proximity, in the case the rate of change of brightness detected by the brightness sensor exceeds a threshold value and the reception strength from the wireless communication apparatus 30 is a predetermined value or higher.

Example 4: Combination of Image Sensor and Reception Strength

The wireless communication apparatus 20 may determine that the wireless communication apparatus 30 is in proximity, in the case the distance to the wireless communication apparatus 30 detected from an image obtained by an image sensor is a threshold value or lower and the reception strength from the wireless communication apparatus 30 is a predetermined value or higher.

Example 5: Combination of Temperature Sensor and Reception Strength

The wireless communication apparatus 20 may determine that the wireless communication apparatus 30 is in proximity, in the case the temperature detected by a temperature sensor exceeds a threshold value and the reception strength from the wireless communication apparatus 30 is a predetermined value or higher. When the wireless communication apparatus 20 is held by a user, the temperature of the wireless communication apparatus 20 presumably rises by the body temperature of the user, and thus, with the configuration described above, a proximity determination may be obtained in the case the user holds the wireless communication apparatus 20 and nears it to the wireless communication apparatus 30.

Example 6: Combination of Geomagnetic Sensor and Reception Strength

The wireless communication apparatus 20 and the wireless communication apparatus 30 may determine their orientations by geomagnetic sensors and exchange the detection results of the geomagnetic sensors, and the wireless communication apparatus 30 may be determined to be in proximity in the case it is perceived that they are facing each other and the reception strength from the wireless communication apparatus 30 is a predetermined value or higher.

Example 7: Combination of a Plurality of Sensors and Reception Strength

Examples where proximity is determined by a combination of a detection result of one sensor and reception strength have been described above, but the wireless communication apparatus 20 may determine proximity by a combination of detection results of three or more sensors, for example, the accelerometer, the gyro sensor and the brightness sensor, and the reception strength.

Example 8: Others

Also, the wireless communication apparatuses 20 and 30 may determine whether they are in proximity to each other by each checking its position by receiving a GPS signal and transmitting a wireless signal regarding the position information to the other. Furthermore, the wireless communication apparatus 20 may include a vibration sensor, and in the case a service discovery query signal is received from the wireless communication apparatus 30 and vibration is detected by the vibration sensor, may determine that the wireless communication apparatus 20 is in proximity to the wireless communication apparatus 30. In this case, the wireless communication apparatus 20 determines that it is in proximity to the wireless communication apparatus 30 when it contacts the wireless communication apparatus 30. Furthermore, the wireless communication apparatuses 20 and 30 may each acquire, from an access point, information on the distance from access point and transmit a wireless signal regarding the distance information to the other to thereby determine whether they are in proximity to each other. Furthermore, by using a sensor that detects contact, detection of contact may be determined as proximity.

[Modified Example Related to Setting of Threshold Value]

Furthermore, the wireless communication apparatus 20 may use, for proximity determination, a different threshold value as a predetermined value, depending on the communication counterpart. For example, the threshold value for a communication counterpart with which a connection procedure is to be performed for the first time based on a proximity determination may be made stricter than the threshold value for a communication counterpart with which connection authentication is already established based on a proximity determination and the profiles or the like at the time of the authentication are held by both parties. According to such a configuration, the allowable range for proximity determination with a communication counterpart with which connection authentication is already established may be made wider than the allowable range for proximity determination with a communication counterpart with which a connection procedure is to be performed for the first time.

[Method of Notifying User of Internal State]

Furthermore, the wireless communication apparatus 20 may notify a user of an internal state regarding proximity determination or a connection procedure by the light of an LED. Also, besides the light of an LED, the wireless communication apparatus 20 may notify the user of the internal state by other methods that use vibration, text, sound, smell, an image or the like.

For example, the wireless communication apparatus 20 may flash an LED from the start of a connection procedure to the completion of the connection procedure, and may light the LED in the case the connection has completed, and flash the LED in red in the case the connection procedure has failed. Also, the wireless communication apparatus 20 may flash the LED from the start of a connection procedure to the completion of the connection procedure, and may display a screen showing to the effect that the connection has completed in the case the connection has completed, and display a screen showing to the effect of non-connection in the case the connection procedure has failed. Alternatively, the wireless communication apparatus 20 may use these in combination.

Additionally, the wireless communication apparatus 20 may notify the user of the internal state by distinguishing between, and using, the light of an LED, vibration, text, sound, smell, an image or the like according to whether it is the first connection with the communication counterpart or not.

Furthermore, the embodiments and the modified examples may be arbitrarily combined. Each of the embodiments is applied to various wireless communication technologies, such as Wi-Fi-Direct, TransferJet, and the like.

Furthermore, configurations as below are also within the technical scope of the present disclosure.

(1)

A wireless communication apparatus including:

a communication unit capable of wireless communication with another wireless communication apparatus;

a determination unit for determining whether the communication unit is in proximity to the other wireless communication apparatus; and a control unit for performing, in a case the communication unit is determined to be in proximity to the other wireless communication apparatus, a connection procedure between the communication unit and the other wireless communication apparatus.

(2)

The wireless communication apparatus according to (1) described above, wherein, in a case reception strength of a wireless signal received by the communication unit from the other wireless communication apparatus is a predetermined value or higher, the determination unit determines that the communication unit is in proximity to the other wireless communication apparatus.

(3)

The wireless communication apparatus according to (2) described above, wherein, in a case the communication unit receives a wireless signal from a plurality of other wireless communication apparatuses and more than one wireless signal exists whose reception strength is the predetermined value or higher, the determination unit determines that the communication unit is in proximity to the other wireless communication apparatus that has transmitted the wireless signal whose reception strength is highest.

(4)

The wireless communication apparatus according to (1) described above, wherein, in a case a connection procedure having proximity to the communication unit as a connection permission condition is allowed, the other wireless communication apparatus transmits a wireless signal including proximity-based connection procedure available information to that effect, wherein the determination unit determines whether the proximity-based connection procedure available information is included in the wireless signal, and wherein, in a case the communication unit is determined to be in proximity to the other wireless communication apparatus and the proximity-based connection procedure available information is determined to be included in the wireless signal, the control unit performs the connection procedure between the communication unit and the other wireless communication apparatus.

(5)

The wireless communication apparatus according to (1) described above, including:

a notification unit for issuing a notification regarding a start of the connection procedure, an end of the connection procedure, a change in status of the connection procedure or a result of the connection procedure.

(6)

The wireless communication apparatus according to (1) described above, wherein the other wireless communication apparatus is a slave unit among at least one slave unit connected to a master unit, wherein the communication unit acquires from the master unit list information of the at least one slave unit, and wherein the determination unit discovers the other wireless communication apparatus based on the list information acquired by the communication unit, and determines whether the communication unit is in proximity to the other wireless communication apparatus which has been discovered.

(7)

The wireless communication apparatus according to (2) described above, wherein the determination unit performs proximity determination using, as the predetermined value, a different threshold value depending on whether or not connection has been established before with the other wireless communication apparatus.

(8)

The wireless communication apparatus according to (2) described above, wherein, in a case the reception strength of the wireless signal received by the communication unit from the other wireless communication is the predetermined value or higher and a predetermined detection result is obtained by a sensor provided in the wireless communication apparatus, the determination unit determines that the communication unit is in proximity to the other wireless communication apparatus.

(9)

A wireless communication method including:

determining whether a communication unit capable of wireless communication with another wireless communication apparatus is in proximity to the other wireless communication apparatus; and performing, in a case the communication unit is determined to be in proximity to the other wireless communication apparatus, a connection procedure between the communication unit and the other wireless communication apparatus.

(10)

A wireless communication system including a first wireless communication apparatus and a second wireless communication apparatus capable of wireless communication, wherein the first wireless communication apparatus includes a communication unit capable of wireless communication with the second wireless communication apparatus, a determination unit for determining whether the communication unit is in proximity to the second wireless communication apparatus, and a control unit for performing, in a case the communication unit is determined to be in proximity to the second wireless communication apparatus, a connection procedure between the communication unit and the second wireless communication apparatus.

What is claimed is:

1. A first wireless communication apparatus, comprising:
a detection unit configured to:
  detect proximity based on a reception strength of a wireless signal received from a second wireless communication apparatus that is equal to or greater than a particular value; and
  detect the proximity based on a first distance between the first wireless communication apparatus and the second wireless communication apparatus;
a communication unit configured to:
  generate, based on the detected proximity, a connection start trigger signal including at least one of an identification information of the first wireless communication apparatus, a destination information of the second wireless communication apparatus, or a connection start request information to start a connection between the first wireless communication apparatus and the second wireless communication apparatus,
  start a connection procedure based on the generated connection start trigger signal, wherein the connection procedure includes a process related to Wi-Fi Protected Setup (WPS), and wherein the connection procedure is executed within a second distance between the first wireless communication apparatus and the second wireless communication apparatus, wherein the second distance is larger than the first distance; and a notification unit configured to notify a status of the connection procedure based on the detected proximity.

2. The first wireless communication apparatus according to claim 1, wherein the notification unit is a display screen that shows information of connection status.

3. A first wireless communication apparatus, comprising:

a detection unit configured to:

detect proximity based on a reception strength of a wireless signal received from a second wireless communication apparatus that is equal to or greater than a particular value; and detect the proximity based on a first distance between the first wireless communication apparatus and the second wireless communication apparatus;

a communication unit configured to:

generate, based on the detected proximity, a connection start trigger signal including at least one of an identification information of the first wireless communication apparatus, a destination information of the second wireless communication apparatus, or a connection start request information to start a connection between the first wireless communication apparatus and the second wireless communication apparatus, start an IEEE802.11 compliant connection procedure, based on the generated connection start trigger signal, within a second distance between the first wireless communication apparatus and the second wireless communication apparatus, wherein the second distance is larger than the first distance; and a notification unit configured to notify a status of the IEEE802.11 compliant connection procedure between the first wireless communication apparatus and the second wireless communication apparatus based on the detected proximity.

4. A first wireless communication apparatus, comprising:

a detection unit configured to:

detect proximity based on a reception strength of a wireless signal received from a second wireless communication apparatus that is equal to or greater than a particular value; and detect the proximity based on a first distance between the first wireless communication apparatus and the second wireless communication apparatus;

a communication unit configured to:

generate, based on the detected proximity, a connection start trigger signal including at least one of an identification information of the first wireless communication apparatus, a destination information of the second wireless communication apparatus, or a connection start request information to start a connection between the first wireless communication apparatus and the second wireless communication apparatus, start a connection procedure, based on the generated connection start trigger signal, within a second distance between the first wireless communication apparatus and the second wireless communication apparatus, wherein the second distance is larger than the first distance; and a notification unit configured to notify a status of the connection procedure between the first wireless communication apparatus and the second wireless communication apparatus.

5. The first wireless communication apparatus according to claim 1, wherein the communication unit is further configured to output the connection start trigger signal including the destination information to the second wireless communication apparatus.

* * * * *